US006729884B1

(12) United States Patent
Kelton et al.

(10) Patent No.: US 6,729,884 B1
(45) Date of Patent: May 4, 2004

(54) E-CRITTER GAME FOR TEACHING PERSONAL VALUES AND FINANCIAL RESPONSIBILITY TO A CHILD

(75) Inventors: Patricia Kelton, Milwaukee, WI (US); Tom Gomoll, Whitefish Bay, WI (US); Tim A. Priebe, Glendale, WI (US); Jim Dempster, Mequon, WI (US); Matthew Aaron Marcus, New York, NY (US)

(73) Assignee: Metavante Corporation, Brown Deer, WI (US)

( * ) Notice: Subject to any disclaimer, the term of this patent is extended or adjusted under 35 U.S.C. 154(b) by 81 days.

(21) Appl. No.: 10/015,057

(22) Filed: Nov. 13, 2001

(51) Int. Cl.[7] .............................................. G09B 19/00
(52) U.S. Cl. ...................... 434/236; 434/323; 434/350; 434/307 R; 463/7; 463/40
(58) Field of Search ............................ 434/236, 307 R, 434/322, 323, 350; 705/14, 35; 345/706, 952; 463/7, 40

(56) References Cited

U.S. PATENT DOCUMENTS

| | | | |
|---|---|---|---|
| 4,856,788 A | | 8/1989 | Fischel |
| 4,913,446 A | | 4/1990 | Winkelman |
| 5,826,878 A | | 10/1998 | Kiyosaki et al. |
| 5,839,976 A | | 11/1998 | Darr |
| 5,954,510 A | * | 9/1999 | Merrill et al. ............... 434/236 |
| 5,971,855 A | * | 10/1999 | Ng ............................... 463/42 |
| 6,032,957 A | | 3/2000 | Kiyosaki et al. |
| 6,061,656 A | | 5/2000 | Pace |
| 6,106,300 A | | 8/2000 | Kiyosaki et al. |
| 6,120,300 A | * | 9/2000 | Ho et al. ..................... 434/332 |
| 6,178,407 B1 | * | 1/2001 | Lotvin et al. ................. 705/14 |
| 6,196,920 B1 | | 3/2001 | Spaur et al. |
| 6,386,881 B1 | * | 5/2002 | Jenkins et al. ............... 434/236 |

OTHER PUBLICATIONS

Activision, Modern Computer People, 1985, entire document.*
www.neopets.com, Neopets, Inc., 1999–2003, pp. 1–9.*
Fleet Bank's "Fleet Kids" (http://www.fleetkids.com), Aug. 28, 2001, p. 1–15.
Aetna Financial Services' "2020 Green" (http://www.2020green.com) Aug. 28, 2001, p. 1–13.
Bonus.coms (http://www.bonus.com) Aug. 28, 2001, p. 1–8.
Republic Bank of Florida "Cool Bank.com" (http://www.coolbank.com) Aug. 28, 2001, p. 1–6.
Firstar Bank's "Escape from KNAB" (http://www.escapefromknab.com) Aug. 28, 2001, p. 1–11.
Securities Industry Foundation for Economic Education, The Stock Market Game™ (http://www.smgww.org) Aug. 28, 2001, p. 1–5.

(List continued on next page.)

*Primary Examiner*—Jessica Harrison
*Assistant Examiner*—John Sotomayor
(74) *Attorney, Agent, or Firm*—Reinhart Boerner Van Deuren s.c.

(57) ABSTRACT

An Internet-based game for teaching personal values and financial responsibility to a child includes interactive game events, an adventure story activity with selectable story elements, a scoring system awarding a virtual collectible creature having artificial intelligence characteristics and characteristics mimicking a financial instrument, and indicia of account information.

33 Claims, 16 Drawing Sheets

OTHER PUBLICATIONS

Chase Manhattan Bank's "Smart Cents" (http://www.chase.com/chase/smartcents) Aug. 28, 2001, p. 1–5.

Making Money Make Sense for Kids, "Kids Money Cents" (http://www.kidsmoneycents.com) Aug. 28, 2001, p. 1–6.

Sovereign Bank of New England's "Kidsbank.com", (http://www.kidsbank.com) Aug. 28, 2001, p. 1–12.

Liberty Financial Companies "Young Investor" (http;//www.younginvestor.com) Aug. 28, 2001, p. 1–9.

Sylvan Book Adventure Foundation's "Book Adventure" (http://www.bookadventure.com) Aug. 28, 2001, p. 1–8.

Schoolpop, Inc. "School Pop" (http://www.schoolpop.com) Aug. 28, 2001, p. 1–7.

Consumer Credit Counseling Service, Service of the Mississippi River Valley et al.'s "Wise Pockets" (http://www.wisepockets.com) Aug. 28, 2001, p. 1–18.

The Alliance for Investor Education (http://www.investoreducation.org) Sep. 21, 2001, p. 1–2.

BigChange Allowance (previously AllowanceNET) (http://www.bigchange.com) Sep. 21, 2001, p. 1–2.

American Expresses' "Credit: Taking Charge of Your Financial Future" (http://www.10.americanexpress.com/sif/cda/page/o, 1641,791,00.asp#yourfinancialpartnership) Sep. 21, 2001, p. 1.

American Savings Education Council "Results of the 1999 Youth and Money Survey" (http://www.asec.org) Sep. 21, 2001, p. 1–3.

Broadwaybank (http://www.broadwaybank.com/Pages/kidbanking.htm) Sep. 21, 2001, p. 1.

BuckInvestor (http://www.buckinvestor.com) Sep. 21, 2001, p. 1–2.

Campus Back Bone (http://www.campusbackbone.com) Sep. 21, 2001, 1–2.

Canadian Bankers Association "There's something about Money" (http://www.yourmoney.cba.ca/eng/index.htm) Sep. 21, 2001, p. 1.

Consumer Education for Teens (http://www.wa.gov/ago/youth) Sep. 21, 2001, p. 1–2.

Consumer Federation of America (http://www.consumerfed.org) Sep. 21, 2001, p. 1.

Cool Math 4 Kids (http://www.coolmath4kids.com) Sep. 21, 2001, p. 1.

Credit Healthy (http://www.credithealthy.com) Sep. 21, 2001, p. 1.

eRaider (http://www.eraider.com) Sep. 21, 2001, p. 1.

Federal Consumer Information Center (http://www.pueblo.gsa.gov) Sep. 21, 2001, p. 1–2.

Girls Inc. (http://www.girlsinc.org) Sep. 212, 2001, p. 1.

Institute of Consumer Financial Education "Children and Money" (http://www.financial–education–icfe.org) Sep. 21, 2001, p. 1–2.

Investing for Kids (http://www.library.thinkquest.org/3096/index.htm) Sep. 21, 2001, p. 1.

Kids Can Save (http://www.kidscansave.gc.ca/no flash/E1h–shplash.htm) Sep. 21, 2001, p. 1.

Kids Money Store (http://www.kidsmoneystore.com) Sep. 25, 2001, p. 1–2.

Kids Money (http://www.kidsmoney.org) Sep. 25, 2001, p. 1–6.

Kidstock (http://www.kidstock.com) Sep. 25, 2001, p. 1.

Lavamind (http://www.lavamind.com) Sep. 25, 2001, p. 1.

Merrill Lynch's "Save Lab" (http://www.plan.ml.com/family/kids) Sep. 25, 2001, p. 1.

National Association of Investors Corporation (http://www.better–investing.org/youth) Sep. 25, 2001, p. 1–2.

National Association of Securities Dealers "The AIE Savings Calculator" (http://www.investoreducation.org/cindex.htm) Sep. 25, 2001, p. 1.

National Center for Financial Education "Springboard" (http://www.ncfe.org) Sep. 25, 2001, p. 1.

National Council on Economic Education (http://www.ncee.net) Sep. 25, 2001, p. 1–2.

National Endowment for Financial Education (http://www.nefe.org) Sep. 25, 2001, p. 1.

NICE (National Institute for Consumer Education) (http://www.nice.emich,edu) Sep. 25, 2001, p. 1–2.

Online Resources for Young Investors (http://www.ici.org/aboutfunds/addl resources young.html) Sep. 25, 2001, p. 1–3.

Real Life Investing Guide (Moolera) (http://www.moolera.com) Sep. 25, 2001, p. 1–2.

Aid Association for Lutherans' "Rock the Cause" (http://www.aal.org/LifeResources/Youth_Resources/Rock_The_Cause) Sep. 25, 2001, p. 1.

Salomon Smith Barney's "young investors network" (http://www.salomonsmithbarney.com/yin/home.htm) Sep. 25, 2001, p. 1.

Social Security Administration (http://www.ssa.gov/kids/start.htm) Sep. 25, 2001, p. 1.

State Bank of the Lakes' "Kids Calculator " (http://www.thisisyourbank.com/future/index.html) Sep. 25, 2001, p. 1–2.

Strong Investment, Inc.'s "Strong Kids" (http://www.strongkids.com) Sep. 25, 2001, p. 1.

Student Credit (http://www.studentcredit.com) Sep. 25, 2001, p. 1–2.

Northwestern Mutual Life Foundation's "The Mint" (http://www.themint.org) Sep. 25, 2001, p. 1–2.

The Money Institute (http://www.themoneyinstitute2000.com) Sep. 25, 2001, p. 1.

Young Biz (http://www.youngbiz.com) Sep. 25, 2001, p. 1–2.

Young Money (http://www.youngmoney.com) Sep. 25, 2001, p. 1–2.

Teen Analyst.com (http://www.youngmonthly.com) Sep. 25, 2001, p. 1.

Consumer Reports for Kids' "Zillions" (http://www.zillions.org) Sep. 25, 2001, p. 1.

Nickelodeon Online "my e–Collectibles" (http://www.nick.com/index.jhtml), p. 1–7.

* cited by examiner

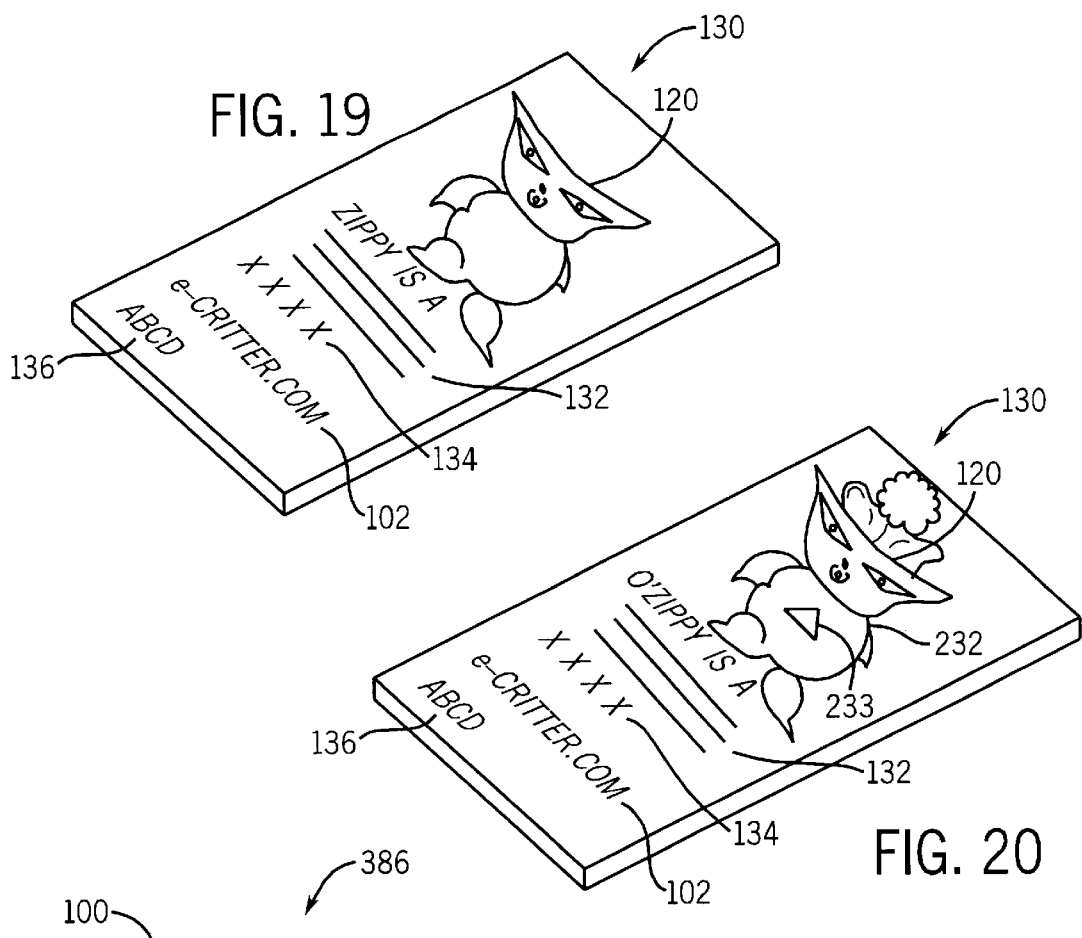

FIG. 17

ANDREA'S POINTS AND SCORE

ACCOUNT INFORMATION

SCORE INFORMATION

| DATE | ADVENTURE | POINTS |
|---|---|---|
| 3/01/01 | BLACK PIT DIAMOND MINE | 26 |
| 4/01/01 | PLANET NEVA | 25 |
| TOTAL POINTS WON | | 51 |

CRITTERCASH INVESTMENT PORTFOLIO

RISK INVESTMENTS

| DATE | DEPOSIT AMOUNT | GAINS | LOSSES | TOTAL |
|---|---|---|---|---|
| 3/01/01 | 26 | | | 26 |
| 3/01/01 | 26 | +2 | | 28 |
| 3/15/01 | | +3 | | 31 |
| 4/01/01 | | | -2 | 29 |

DR. DARK IS LOOSE IN THE RISK CAVE! HE'S BUSY SNATCHING UP POINTS. LOOK OUT FOR DEDUCTIONS

SAVE IT INVESTMENTS

| DATE | DEPOSIT AMOUNT | GAINS | LOSSES | TOTAL |
|---|---|---|---|---|
| 4/01/01 | 25 | | | 25 |
| 4/01/01 | | +2 | | 27 |

YOU'VE EARNED 2 POINTS TODAY FOR MAKING A SAFE INVESTMENT DECISION!

| TOTAL CRITTERCASH POINTS INVESTED | 56 |
|---|---|

COLLECTIBLES

| E-CRITTER COLLECTION | |
|---|---|
| E-CRITTER | NUMBER |
| ZIPPY E-CRITTER | 1 |
| STINGY E-CRITTER | 1 |

CLICK HERE TO GO TO THE CRITTER PLAYPEN

E-CRITTER GAME FOR TEACHING PERSONAL VALUES AND FINANCIAL RESPONSIBILITY TO A CHILD

BACKGROUND OF THE INVENTION

Field of the Invention

The invention relates generally to children's educational games, and more particularly to an Internet-based game for teaching personal values and financial responsibility to a younger child.

In 1995, American children between the ages of 4 and 12 spent $24 billion of their own money. Also, children influenced how their parents' money was spent. A study estimated that children between the ages of 4 and 18 influenced family expenditures of another $500 billion in 1995.

Due to varying social changes in family life, e.g., fewer children per family, a rise in the number of single parent families, older parents and dual-income families, children are becoming knowledgeable consumers at younger ages. With fewer children per family, parents have more money to spend for each child. With the rise in the number of single parent families, many children assume more home related and purchasing responsibilities at younger ages. With the rise in the age of new parents in the work force, older parents are often in a better financial position to provide more money to be spent on their children. With both parents working, children often have more money and more responsibilities.

Since children at earlier and earlier ages have larger amounts of disposable monies and in some cases have responsibilities of purchasing food, clothing, or school supplies, or are purchasing toys and games, movies, arcade games on their own, many parents have recognized a need for educating their children in financial matters. The risk of a non-financially educated child losing or mismanaging real money is serious. Parents have looked to schools for help.

Attempts have been made to educate younger children in financial matters in our schools, but our schools are just not doing the job well enough. Hereinthroughout, the terms "younger child" or "younger children" mean a child or children in the age group of 8 years old to 12 years old. Even our older children are not making good, or even adequate, financial grades. A recent survey of "Personal Financial Information" completed by 12th graders from across the country showed that the 12th graders only scored 51.9% on the survey. These older children were weakest in financial matters such as money management, savings and investment and credit.

Parents have tried to supplement their younger child's financial education using financial education products such as, books, websites, on-line games, off-line games (board games) and toys. It is known to provide games for teaching financial skills to players; such known games are disclosed in U.S. Pat. Nos. 6,106,300, 6,032,957, 5,826,878, 4,913, 446, 4,856,788. It is also known to provide on-line computer websites geared to teaching children financial concepts such as Bonus.com's (http://www.bonus.com) "Money Center" games (which are similar to board games), The Stock Market Game™ (http://www.smgww.org), and "Kids Money Cents" (http://www.kidsmoneycents.com, an off shoot of the popular "Dollars & Cents," book and money management camp for kids). With today's children being raised in an environment of fun entertainment such as video games and MTV, these aforementioned financial education products provide fun without the financial content, or financial content without fun.

In addition, some financial institutions (including asset based money management companies) have tried to help parents by offering programs geared to educating children in financial matters. It is known for financial institutions to provide on-line computer web-based game sites geared to teaching children (typically children ages 3–6 or high school students) financial concepts; for example, these include Fleet Bank's "Fleet Kids" (http://www.fleetkids.com), Aetna Financial Services' "2020 Green" (http://www.2020green.com), Republic Bank of Florida's "Coolbank.com" (http://www.coolbank.com), Firstar Bank's "Escape from Knab" (http://www.escapefromknab.com), Chase Manhattan Bank's "Smart Cents" (http://www.chase.com/chase/SmartCents), Sovereign Bank of New England's "Kidsbank.com" (http://www.kidsbank.com), Liberty Financial Companies "Young Investor" (http://younginvestor.com), and Consumer Credit Counseling Service of the Mississippi River Valley et al.'s "Wise Pockets" (http://wisepockets.com).

These on-line sites have problems in introducing adult financial concepts at a level suitable for a child, e.g. simplifying adult concepts for kids, in mimicking a financial text book without providing entertainment value or in providing some entertainment value while providing little or no further learning of financial concepts in terms of providing a "kid economy" for investing, trading and communicating in the community. Furthermore, most financial institutions treat younger children as small adults, providing the children with credit cards, debit cards and on-line banking, but failing to provide them with a context in which to use these adult financial tools and failing to recognize that each generation has different financial needs than that of its parents.

It is also known to provide free reading motivation programs for children in grades K–8 via the web, for example "Book Adventure" (http://www.bookadventure.com), by giving points for mastery of materials. It is also known to provide an Internet-based store, school catalog and on-line merchants with parents and the community to raise money for schools K–12 nationwide, as for example, "Schoolpop" (http://www.schoolpop.com). Furthermore, it is known to provide children's game sites via the web where kids can accumulate points by playing games and trading points for collectibles and swap collectibles with other kids as for example, Nickelodeon's (http://www.nick.com). However, neither "Schoolpop" nor "Book Adventure" nor Nickelodeon provide an adventure story content for teaching financial concepts, nor do they provide the younger child with real-world learning opportunities by providing an elaborate kid economy for investing, trading and communicating in the community. Nor do the aforementioned websites provide back-end technology for "near-money" (i.e. non-financial units of value which behave in ways similar to financial currencies) and customer profiling applications.

Typically, neither schools nor the family provide younger children with enough tools to understand the abstract and complex notions about money and finances. Nor is this shortcoming met by financial institutions. Younger children need opportunities to experience the realities of markets without incurring all of the risks. Parents and teachers are in need of better ways to provide younger children with a concrete understanding of the abstract concepts surrounding financial markets and monetary systems, in ways that the children understand and are comfortable with.

What is needed is a fiscally safe enviroment, geared to engage younger children's interests and compatible with their developmental stage which holds their interest through stories and activities to teach them personal values and financial responsibility, and which provides rewards to them for their efforts. What is also needed is a technology which is enlargeable for near-money and customer profiling applications.

SUMMARY OF THE INVENTION

The present invention includes an Internet-based game that engages the younger child through activities that mitigate financial risk and closely mimic a child's values. The game is for teaching personal values and financial responsibility to the younger child. It is an on-line interactive computer based game that integrates entertainment, education and commerce, providing a concrete understanding of an ever-complicated financial system to the younger child. The game comprises a set of computer interactive selectable game events, a scoring system in playing the game events and indicia of account information associated with the younger child. The game events have an adventure story activity and an educational activity. The adventure story activity has a selectable story element.

The younger child is given an award for scoring while playing the game. The scoring system includes an assignment of an award; the award includes a virtual collectible creature. The virtual collectible creature has an artificial intelligence characteristic and a characteristic mimicking a financial instrument. The assignment of the award also includes an assignment of points. The indicia of account information includes information about the virtual collectible creature. The indicia of account information also includes information on a tally of the points and information on an investment of the points.

In part, the present invention is a method of providing the aforementioned Internet-based game for teaching personal values and financial responsibility to a younger child. The method comprising the steps of: (1) providing the aforementioned Internet-based game of the present invention for teaching personal values and financial responsibility to the child; (2) providing the child with access to the adventure story activity and providing the selectable story element for the child to select; (3) providing the child with the interactive game events for the child to interact with and providing the assignment of the award for the child to receive; and (4) providing the account information for the child to review. The award includes the virtual collectible creature.

In part, the present invention includes a virtual collectible creature comprising an artificial intelligence characteristic and a characteristic mimicking a financial, instrument. The game of the present invention is based on the inventors' research into younger children's play activities to establish and define values, both personal and financial. The meaning of value to younger children varies depending on the context of purchasing items, for instance purchasing in an adult economy or play purchasing in a game economy.

Younger children often access the adult economy through limited outlets, namely visits to supermarkets, discount/retail stores, convenience stores and fast food restaurants or stores. Thus some of the younger children have a limited experience of the adult economy's concept of "real value." The younger child may encounter real value of an item when purchasing a toy or a food type items. In the adult economy, value is based on "real value" in an open market. An example of the real value of an item is the retail price of an item like a toy or a food purchase, such as a loaf of bread.

Since younger children have experience with board games, yet another type of value is identified by these children. In the board game market, typically items have "play value." The play value is a value given to an item which may be purchased only in a limited context of a given play scenario. An example of "play value" is "Monopoly Money," used in the MONOPOLY® board game to purchase, an item, such as a hotel in the board game.

The inventors have discovered still yet another type of value recognized by the younger child. The inventors have discovered that younger children value certain items differently than adults, assigning to an item a "kid value." The "kid value" is defined herein as items with or without real value that have significant value to younger children. Some items, with or without real value, that are non-food related and that have significant value to younger children are classified into four types of collectible items. The four types of collectible items are: fashion items (wearables, e.g., clothing, shoes, patches, pins and trinkets), fantasy items (dolls, action figures, books toys, make-up, clothing, sports equipment and team-affiliated clothing), celebrity items (sports wear and shoes associated with sports figures, sports cards, posters and stickers) achievement items (trophies, badges, certificates, completed collections (e.g., stamps, toy cars, toys)) and indicia of winnings, such as, but not limited to, marbles won in a game or toys won at a fair or carnival.

The terms "kid value" or "kid values" is defined herein as a value assigned to an item which is determined by the activity in which younger children and their items are engaged and by play potential inherent in that particular object. As used herein, the term "engaged" means to cause the younger child to be interested in the activity and to keep thinking about it, or to attract and keep the younger child interested in the activity.

Play potential is defined by, but is not limited to, the following variables: potential play-length inherent in an object, potential for social interaction inherent in an object, a positive personal memory evoked by a particular object for the child, level of difficulty in obtaining a particular object, story value surrounding the object, unique qualities of any particular object or set of objects, scarcity of a particular object, and value of a particular object within close social relationships.

The inventors discovered six distinct child play activities that have significant value to younger children and which are directly correlated to adult financial management responsibilities. The child play activities are conquer (or master), compare (or trade), create (or pretend), commemorate, compete, and construct. These child play activities are directly correlated with following respective adult financial management activities: specializing in a given area, evaluating (or analyzing), considering scenarios, celebrating success, competing and manufacturing, respectively.

The game of the present invention engages younger children through these six child play activities to provide a better understanding of financial concepts to better understand the real value of an item and/or of an economic system. The game of the present invention includes teaching of financial concepts through the game activities. The financial concepts include but are not limited to, savings, credit, investment, interest, dividends, spending, scarcity, risk vs. safety, price vs. value, competition, goal setting, inflation, taxation and debt.

The game of the present invention also promotes an innovative solution to the teaching of younger children by providing an ethical, humanistic personal value system, which engenders trust, honesty and fairness. The game of the present invention, through the game activities, teaches the younger child personal values such as, but not limited to, responsibility, balance, control, respect, fairness, honesty, integrity, team work, ambition, patience and delayed gratification.

In addition, the game of the present invention is a fun and entertaining experience for the younger child while providing him or her with a jump-start in the financial world, teaching the child responsibility, fiscal balance, control and respect. The game of the present invention is played in an Internet setting that is widely accessible, highly diverse and with global appeal. Thus, the game of the present invention provides educational value in a setting that engages younger children though the activities native to their economy. Hereinafter, the "younger child" or younger children are referred to generically as "child" or "children".

In light of the foregoing, it is an object of the present invention to provide an Internet-based game for teaching personal values and financial responsibility to a younger child, thereby overcoming the various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to enable the younger child to engage with a virtual collectible creature awarded in the game of the present invention where the virtual collectible creature is imbued with artificial intelligence characteristics, mimicking the conventions of a financial instrument.

It is an object of the present invention to be a public relations tool to be used by a financial institution to build relationships with families through education of the younger child in personal values and financial responsibility, by providing the game of the present invention to the younger child.

It is an object of the present invention to provide a marketing system between a financial institution and a retailer by providing the game of the present invention to the younger child through the auspices of the financial institution and by providing redeemable awards at the retailer.

It is an object of the present invention to provide retailers with a marketing campaign and a loyalty system of generating multiple new hobby activities and continued interest through the inexpensive creation and replication of a virtual collectible creature.

It is an object of the present invention to provide a retailer with a game that is a means of supporting the educational goals of schools and parent while still promoting the retailer's individual marketing agenda.

It is an object of the present invention to provide the game of the present invention to be used by a teacher to teach a younger child personal values and financial responsibility, where the risk of losing real dollars is removed.

It is an object of the present invention to provide the game of the present invention to be used by a teacher to motivate a younger child with awards of a virtual collectible creature.

It is an object of the present invention to provide technology which may be used for near-money and customer profiling applications.

Other objects, features, benefits and advantages of the present invention will be apparent from this summary and subsequent descriptions of the various preferred embodiments and will be readily apparent to those skilled in the art having knowledge of various children's educational games, such as, but not limited to, Internet-based games for teaching personal values and financial responsibility to a younger child.

DESCRIPTION OF THE DRAWINGS

These and other advantages of the present invention are best understood with reference to the drawings, in which:

FIG. 15 is a pop-up screen display of the present invention, illustrating information provided for the activity of spending points;

FIG. 17 is a screen display of the present invention, illustrating account information;

FIG. 19 illustrates an e-Critter trading card; and

FIG. 20 illustrates a brand associated e-Critter shown on an e-Critter trading card.

DETAILED DESCRIPTION OF THE PREFERRED EMBODIMENT

Figure 1:
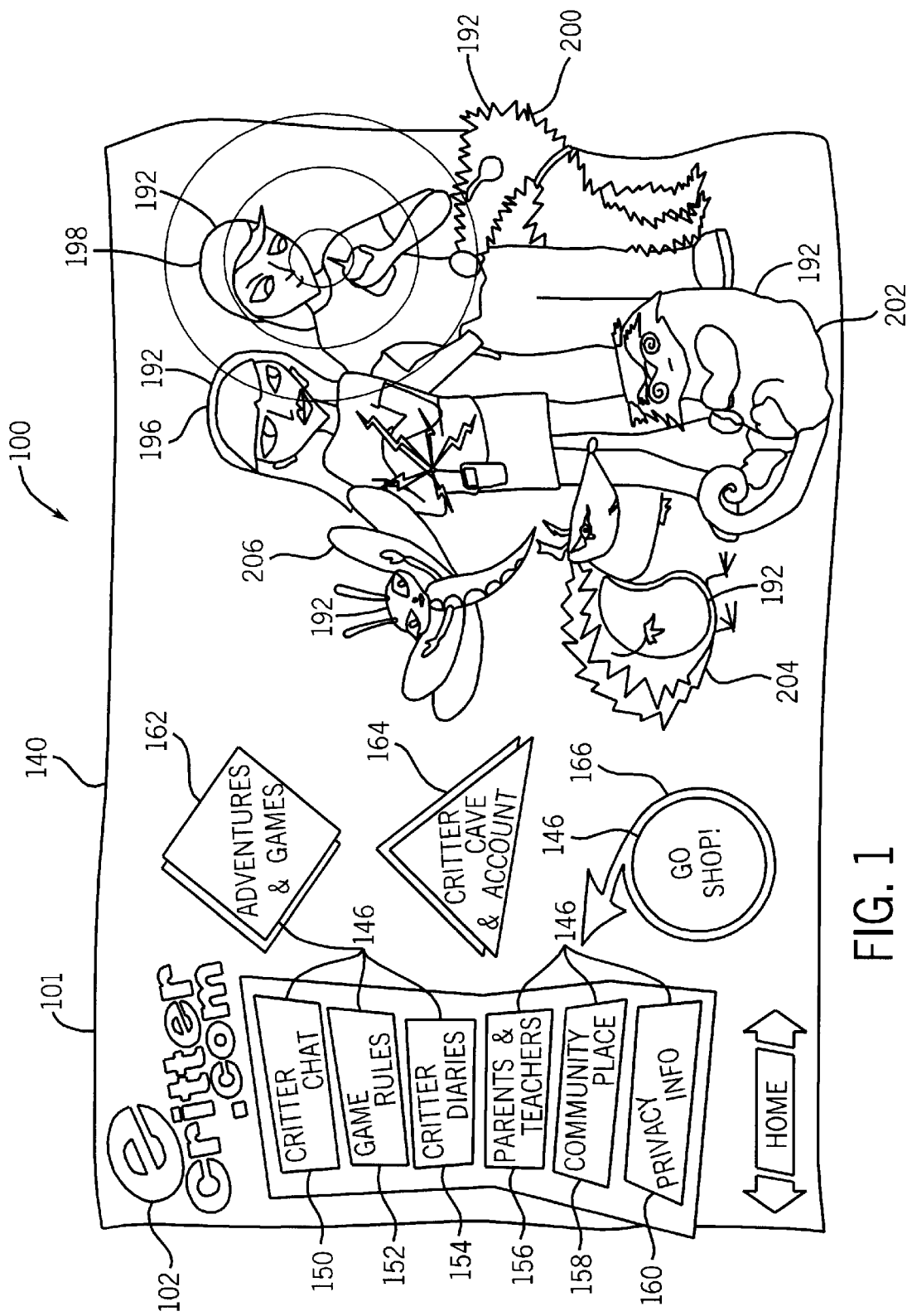
FIG. 1 is a home page screen display of the present invention.

Before of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is means to encompass only the items listed thereafter. The use of letters to identify steps of a method or process is simply for identification and is not meant to indicate that the steps should be performed in a particular order.

The present invention is first described in general and then more specifically under the section referring to FIG. 1–18 sequentially. The first embodiment of the present invention includes an on-line Internet-based interactive game 100, hereinafter also "game" or "game of the present invention", operated by a game site operator at an on-line game site 101 (hereinafter also, "game site" or "e-Critter website"). To play the game 100 of the present invention, a child requires Internet access. Preferably, a child requires computer equipment including a computer hard drive, a display monitor, a keyboard, a device for selection, (such as, but not limited to, a mouse or a trackball or other pointing device to move a cursor to enable the child to select a link or menu option by "pointing to and to clicking on" a selection on a screen display of the display monitor, or a touch screen, whereby the child merely selects a portion of the screen of the display monitor to select a link or a menu option) and a modem (or other access to the Internet) and speakers. Alternatively, the child may play the game 100 via a PDA, a mobile phone, an Internet appliance or another Internet enabled device. As shown in FIG. 1, which will be explained in detail later, the game 100 is accessed by the child via a URL 102 for the game site 101 of the present invention. The game site operator is preferably a financial institution, or a service provider for a financial institution or other provider, but may be a major retailer or an educational partner.

Figure 2:
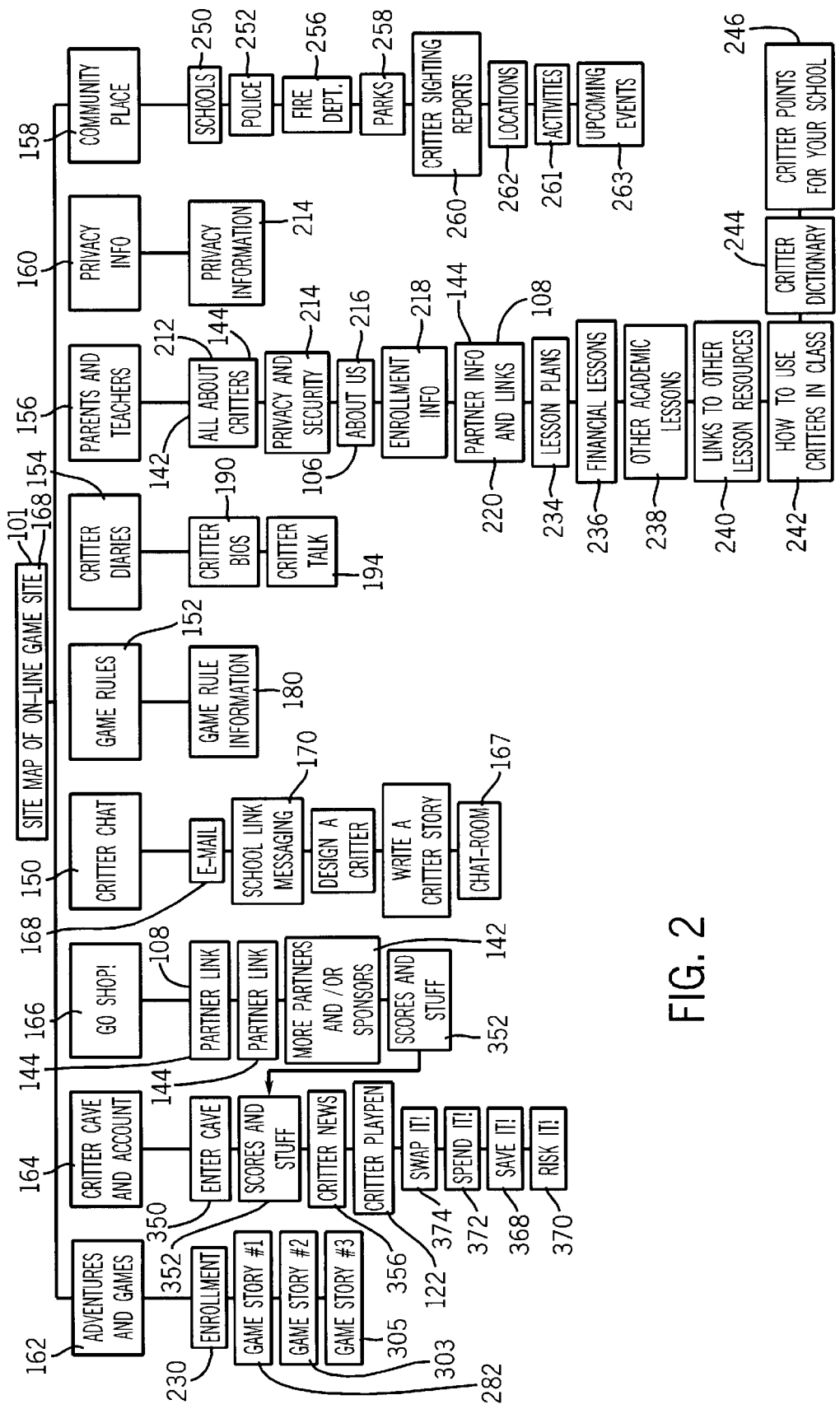
FIG. 2 is a site map of the game of the present invention.

As shown in FIG. 2, which will be explained in detail later, the game 100 has one or more sponsors 106 (hereinafter also, "sponsors" or "sponsor"). The sponsor 106 is an entity that supports the game 100 of the present invention. A sponsor 106 may be, for example, a corporation, a business, an organization, a school, a benevolent society, a philanthropic society, or individual or group of investors, or a community based organization, for example a library, a police department, a fire department, or a church. The game 100 has one or more participating partners 108 (hereinafter "partner" or "partners" or "partner entity"). The partner 108 is an entity that redeems awards won by the child in the game 100. Partners 108 may include entities, devoted to children's interests, such as, but not limited to, banks, financial institutions, children's book clubs, children's toy stores, restaurants or fast-food establishments catering to children's business, recreational businesses catering to children, educational businesses catering to children, travel resorts catering to children's interests, or a retailer catering to children's interests. A sponsor 106 may also be a partner 108.

The game 100 engages the child through activities in a story telling environment that mitigates financial risk and closely mimics kid values (child values). As shown in FIGS. 4, 5, 6, 7, and 8 the game 100 comprises a set of computer interactive game events 110. The game events 110 have an adventure story activity 112 and an educational activity 114. The adventure story activity 112 has a selectable story element 116. To keep the child engaged, a new adventure story activity 112 is introduced at periodic time intervals, preferably on a monthly frequency. Also, animation used in the current adventure story/activity may be varied periodically, preferably on a weekly basis.

Figure 7:
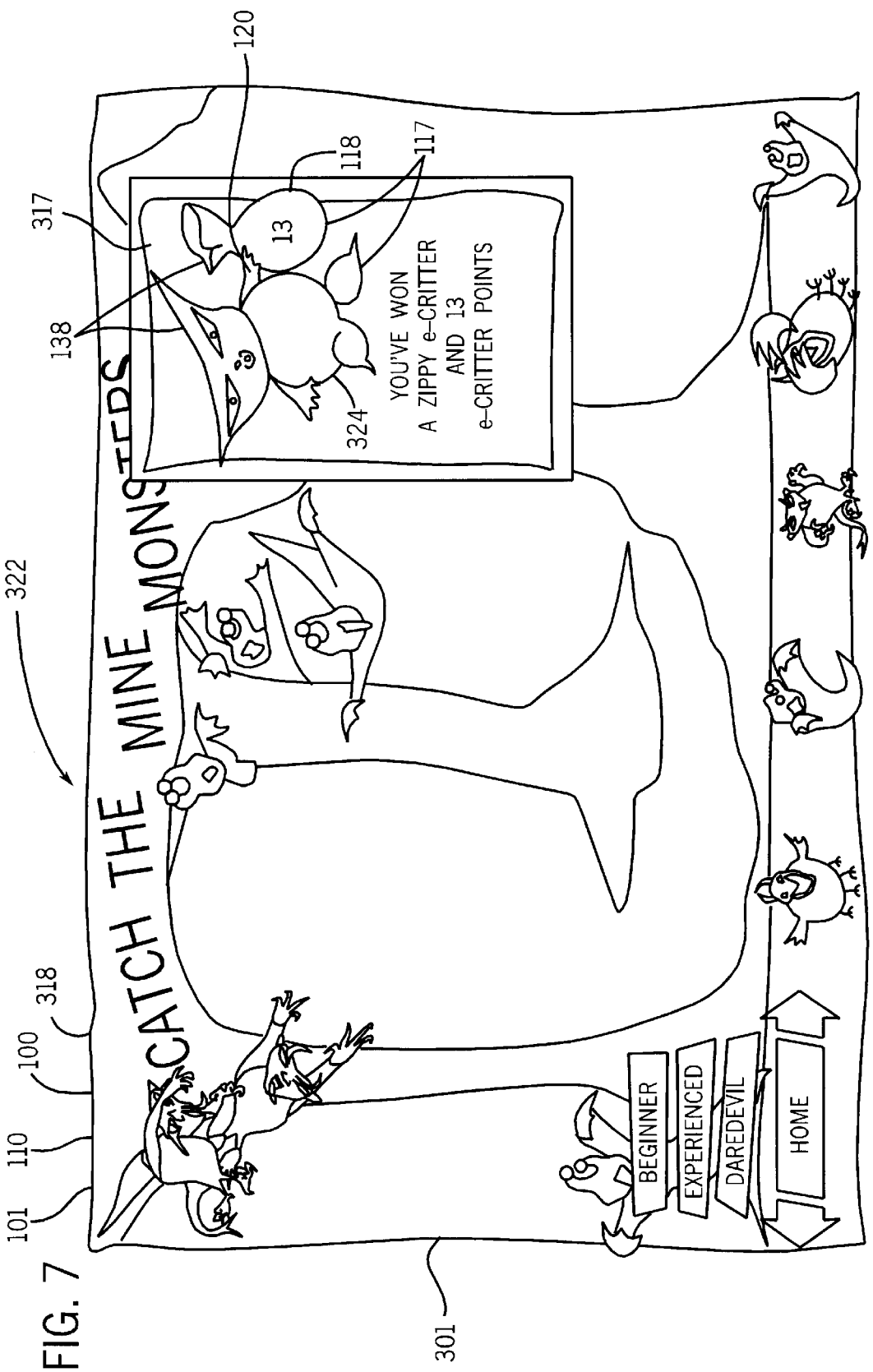
FIG. 7 is a screen display of the present invention, illustrating the awarding of a virtual collectible creature for completing a game activity.
Figure 9:
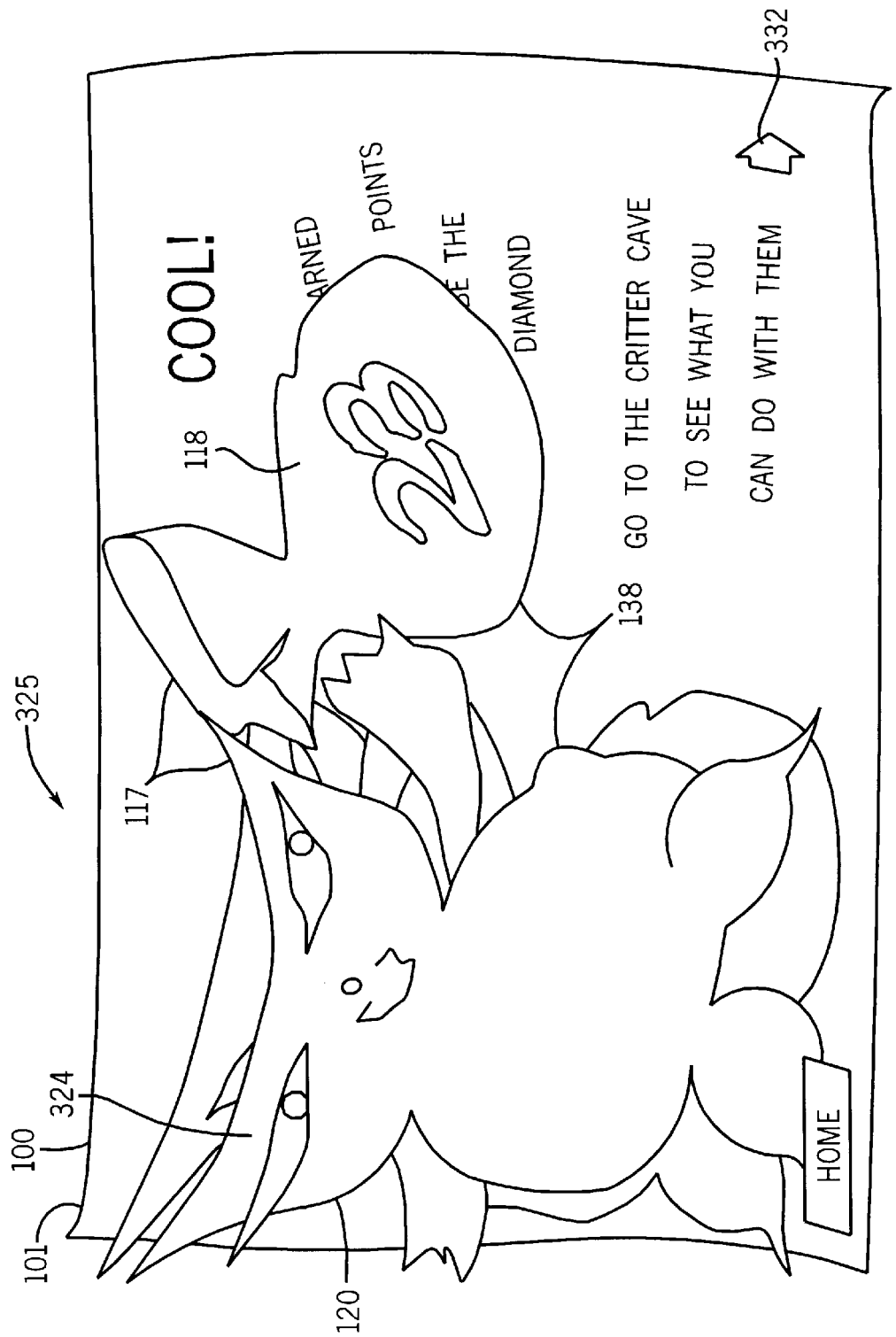
FIG. 9 is a screen display of the present invention, illustrating awards of the present invention.

As the child progresses on-line through the adventure story activity 112 and educational activity 114, the child is awarded with an assignment 117 of a virtual collectible creature 120 or with points 118 and a virtual collectible creature 120. This is shown in FIGS. 7 and 9. The virtual collectible creature 120 exists on-line and is also called an "e-Critter" 120 or a "critter" 120. The points 118 are also called "Critter Cash Points" 118.

Each e-Critter 120 is imbued with one or more artificial intelligence characteristics and mimics one or more conventions of a financial instrument. Financial instruments include, but are not limited to: stocks, bonds, savings accounts, credit cards, money market accounts, certificates of deposit, mutual funds, investments, interest, dividends, taxation and debit cards. For example, an e-Critter may split into two to mimic the way a stock splits; or the e-Critter may grow larger to illustrate how dividends are paid or how a savings account grows in value. The artificial intelligence characteristics of the e-Critter include, but are not limited to human behaviors such as play behavior and interactive behavior associated with the child play activities of conquering, comparing, creating, commemorating, competing and constructing.

Preferably the e-Critter 120 is imbued with the characteristics of a credit card, a certificate of deposit, a money market account or a mutual fund (or an individual stock or a bond). The e-Critter 120 having the characteristics of a mutual fund is imbued with the characteristics of a stock fund that can fluctuate in value and be traded. Each e-Critter 120 has a specific character that makes it function differently than other e-Critters 120. Thus collections of different e-Critters 120 become available and attractive to the child.

In the game 100 of the present invention, e-Critters 120 are traded by the child to other children in an e-Critter market, a virtual market for trading the e-Critter on-line (e-trading). The e-Critter market is entered via a "Swap It" 374 choice via a "Critter Cave" link 350. The game site operator uses a collectability model or a stock model (hereinafter, "collectability/stock model") to control the value of the e-Critter 120. In the collectability/stock model, the value (points associated with) of an e-Critter 120 can fluctuate depending on the trading market for that particular e-Critter 120. The trading market is based on a number of factors: availability of the e-Critter 120, rarity of the e-Critter 120, length of time the e-Critter 120 has resided in the e-Critter market, the number of e-Critters 120 of a particular type being e-traded by the children and the volume of the trade. (Certain e-Critters may be more desireable to children than others and may be more heavily traded by the children.) The game 100 of the present invention is varied by the game site operator by controlling the flow of e-Critters 120 into the game, creation of new e-Critters 120, and creation of new adventure story activities 112, thereby creating value in the e-Critter market and illustrating the financial concept that value is equivalent to scarcity plus demand.

Alternatively, the game site operator may use a system algorithm model to control the value of the e-Critter 120. In the system algorithm model, each of the e-Critters 120 are created with a predetermined biology causing the e-Critter 120 to fluctuate according to set rules. Some e-Critters 120 are set up to gain value in a specified way or time frame. Other e-Critters 120 are created to have a constant value, or a decreasing value under certain conditions. Various e-Critters 120 are created, which mimic slow growing funds or fast growing funds, or high-risk funds that lose value over time, credit cards, or certificates of deposit, or money market accounts, or mutual funds.

Yet, alternatively, the game site operator uses a combination of the collectability/stock model and the system algorithm model to value the e-Critters 120 in the game 100 of the present invention.

Preferably, the game site operator uses the combination of the collectability/stock model and the system algorithm model to value the e-Critters 120.

As shown in FIG. 17, a tally 418 or score of the points 118 accumulated by the child while playing the game 100 are kept by the game site operator along with information about the virtual collectible creature 120 and account information 128 associated with the child and a tally of total points accumulated 126.

After the adventure story activity 112 of the game 100 is completed, the child is encouraged to review his/her account information 128 and make choices regarding trading and valuing of the e-Critter 120, saving points 118, risking points 118 and/or redeeming points 118 to purchase merchandise from one or more participating partners 108.

As best shown in FIG. 19, the child may also have access to an e-Critter trading card 130 (hereinafter, "e-Critter card" or "e-Critter cards"). The e-Critter card 130 is a card that has an image of an on-line e-Critter 120 upon it and bears related information 132 about the e-Critter 120, such information 132 includes, but is not limited to, personality traits, history, unique characteristics, pictures and fun facts about the e-Critter 120. The card 130 may have a code 134 thereon which is an indicator of Critter Cash points 118 to be used on the on-line game site 101. The card 130 also bears information on the URL 102 of the on-line game site 101. The card 130 may also bear a logo 136 from a sponsor and/or a partner. The e-Critter card 130 is used within the established trading card and reward system for a younger child.

The individual e-Critter cards 130 are purchased from financial institutions who are sponsors at a sponsor's outlet or via the mail. Alternatively, a collection of e-Critter cards is purchased from the sponsor as a starter kit, similar to a starter kit of baseball cards or marbles. The starter kit contains enough e-Critter cards 130 for the child to become an active member of an e-Critter community. The e-Critter community is a group of players of the game 100 of the present invention. It includes children, parents, administrators, teachers, community participants (hospital workers, law enforcement officers, firefighters, etc.), sponsors, financial institutions, and/or partners. E-Critters cards 130 may be given out by any of the partners 108, or by any of the sponsors 106 or by the game site operator. For example, the e-Critter cards 130 are given out at participating partners 108, for example, at retailers or retail outlets for special promotions and sales incentives. At a school sponsor, a child's teacher gives the child the cards 130 as rewards for scholastic achievement or good citizenship. Parents give their child an e-Critter card 130 as a gift or as an allowance or as a reward for chores or good behavior. A non-profit organization sponsor distributes an e-Critter card 130 to a child for performing good deeds. The e-Critter cards 130 allow trading of the cards 130 and a level of play with little or no on-line interaction with the game 100 of the present invention.

Referring now to FIGS. 1–18, the game 100, in accordance with the present invention is played on-line by the child using a personal computer with a web-browser having access to the Internet and the World Wide Web ("www" or "web") according to the following method: a) providing the child with the game 100 of the present invention; b) accessing the adventure story activity 112 and selecting the selectable story element 116; (c) interacting with the interactive game events 110 and receiving the assignment of an award 138, the award 138 including the virtual collectible creature 120; and (d) reviewing the account information 128.

To access the game 100 of the present invention, the child enters the URL 102 of the game site 101 of the present invention into the web browser. Once the URL 102 of the game site 101 has been entered, the child enters the e-Critter website 101 and a home page screen 140 is displayed (also, "home page screen display") on the display monitor.

FIG. 1 illustrates the home page screen display 140 for playing the game 100 of the present invention. The home page display screen 140 has a number of links 146. The home page screen 140 gives the child, and/or parent, and/or teacher access to some basic information about the game site 100 and includes educational information and links to a website(s) of the sponsor(s) (hereinafter also, "sponsor's site" or "sponsors' sites" or "sponsor's website" or "sponsors' websites") and a website(s) of the partner(s) (hereinafter also, "partner's site" or "partners' sites" or "partner's website" or "partners' websites"), without a formal log-on to the sponsor's site and/or the partner's site. The home page screen display 140 bears the URL 102 of the game site 101.

The child merely selects a link 146, typically by pointing and clicking on the linkage to enter a particular link. The link 146 include, but are not limited to, a "Critter Chat" link 150, a "Game Rules" link 152, a "Critter Diaries" link 154, a "Parent's & Teacher's" link 156, a "Community Place" link 158, a "Privacy Information" link 160, an "Adventure & Games" link 162, a "Critter Cave & Account" link 164 and a "Go Shop!" link 166. Each of the links (150, 152, 154, 156, 158, 160, 162, 164) will be described in turn.

Critter Chat Link

Referring now to FIG. 2, a site map 168 of the game 100 present invention, the "Critter Chat" link 150 is a link to the e-Critter website 101. Through the "Critter Chat" link 150 the child contacts the e-Critter website 101 via e-mail 168 with his/her opinions about anything in the site 101. The link 150 provides organized contests to encourage the child to participate in modifying his/her own play environment, in having an opinion, and in voicing that opinion. Contests include: designing a new character, suggesting a location for a new adventure story, drawing a new adventure pod, writing a new e-Critter story, etc. The results of the contest are posted on the e-Critter website 101 along with information about the winner.

At link 150, the child can share ideas for new e-Critter characters and/or adventures or design a new e-Critter 120.

The "Critter Chat" link 150 also has a school link 170 for messaging. This is a place for schools to participate in the e-Critter community. For example, schools may post on-line classroom achievements so that schools can compete against one another for classroom and school awards. At the school link 170 the child may also contact the e-Critter website 101. The Critter Chat link 150 may include a link to a chat-room 167 for children to communicate with each other via e-mail about their collections of virtual collectible creatures awarded in the game 100 of the present invention. The chat room 167 is monitored by an adult. Whenever the chat room 167 is open, children have a voice on the e-Critter website 101.

"Game Rules" Link

The "Game Rules" link 152 is a link to the rules 180 of the game 100. The rules 180 of the game include the following:

"E-Critter Game Rules":
  Logon, enter your name and your password. You must register to score points. If this is the first time you are playing the game, ask your parent or teacher to help you. The e-Critter game has a game engine which tracks your identity as a player and your scores.
  The game includes 3 levels of questions. Everyone starts at the lowest level. Questions are administered randomly from a large pool of questions. You accumulate points and an e-Critter (a virtual collectible creature) after an entire game has been completed.
  The game must be finished from beginning-to-end for you to receive points and the e-Critter. Getting high scores immediately bumps you to the next level of questions. You will receive an e-mail notifying you of your progression to the next level. Getting lower scores mean you stay at the same level until better scores are achieved.
  Points can be traded for discounted merchandise at participating partners. Specific transaction details are negotiated with the participating partner. For more information, go to the Home Page and click on the "Go Shop!"link and then click on the "Partner" link. The Game Rules for redeeming points vary by partner type. For example, for banks marketing this game, the "Critter Cave and Account" area may allow typical banking transactions such as savings account deposits from parents. If you are playing the game through your school, the school may receive awards from a partner such as a school book vendor.

"Critter Diaries" Link

The "Critter Diaries" link 154 provides a menu option to access "critter bios" 190, information on biographies of individual e-Critters characters 192, and a menu option to access a section called "critter talk" 194. The e-Critter characters 192 are Allie 196, Matt 198, Razor Dog 200, Willow 202, RatBoy 204, and Queenie 206. The e-Critters characters 192 are complicated and multi-faceted having detailed histories, skills, and personality quirks just like any living being. The "Critter Diaries" 154 provide background stories on the e-Critters 120 and on e-Critter characters 192 so that children learn intimate details about the e-Critters 120 and the e-Critter characters 192. This encourages children to think of the e-Critter characters 192 as on-line friends and to identify personally with them. This identification with the e-Critter characters 192 allows children to emulate the e-Critter characters' positive behaviors, thereby adding to the child's personal and emotional growth.

"Critter talk" 194 is a menu option for the child to select to send e-mail to the e-Critters 120 and to the characters 192 and to receive responses back from them.

Parents & Teachers Link

The "Parents and Teachers" link is a link 156 for parents and teachers to provide them with basic information about the game site 101. The parent and/or teacher is able to select menu options, including the following menu options: "All About Critters" 212, "Privacy & Security" 214, "About Us" 216, "Enrollment Info" 218, and "Partner & Info" 220 links. The present invention encourages parental involvement. The parent can play the game 100 of the present invention with the child. Advantageously, the link 156 also educates parents in the need of basic education on finances.

The "All About Critters" menu option 212 provides an introduction to a concept of e-Critters 120 and the game 100 of the present invention. At "All About Critters" 212, an explanation is given of the educational benefits of the game 100, the backing by sponsors 106, and the partners 108 and/or sponsors 106 redeeming awards 138. The parent is able to turn off a child's access to a sponsor's site 142 and/or a partner's site 144 by selecting a turn-off option. This turn-off option takes the sponsor's website link 142 and/or the partner's website link 144 off the game website 101 when the child logs on.

The parent also has the ability to restrict a child's actions on the game 100 of the present invention for a limited time.

The "Privacy and Security" menu option 214 provides the parent access to the privacy rules and security procedures for the present invention. The privacy rules and security procedures include rules making the site compliant with federal child protection/privacy standards, such as, the Federal Child On-line Protection and Privacy Act of 1998.

The "About Us" menu option 216 provides information about the game site operator. It may also provide information about the sponsor(s) 106. It may also provide a link to a sponsor's website 142.

The "Enrollment Info" menu option 218 provides enrollment information to the parent. The enrollment information may explain that parents may allocate funds for the child to use on the Internet for e-commerce within the sponsor's site 142 and/or within the partner's site 144. The child's parents may set up on-line funds in an on-line banking account for their child.

The parent may set aside some of the on-line funds for the purchase of e-Critters 120 for use in the game 100 of the present invention. This allows the child to gain access to the on-line funds without the assistance of the child's parents.

The parent may set up an on-line banking account for the child by enrolling the child in the game 100. This is done by selecting the "Adventures & Games" display screen 162, which provides access to an enrollment screen display 230. The enrollment screen 230 will be discussed in detail when the "Adventure & Games" link 162 is discussed.

The "Partner Info & Links" 220 is a menu option which discloses the different partners 108 participating in the redemption of the points 118 awarded in the game 100. This menu option 220 provides links to one or more partners' site 144. The partners' sites 144 are an e-Critter web on-line store where the child can trade for discounts and merchandise by redeeming Crittercash Points 118. The partner 108 and/or sponsor 106 may also make available individual "brand" associated e-Critters 232 on the sponsor's site 142 and/or partner's site 146. The "brand" associated e-Critter 232 bears an indicia of association 233 with a particular partner and/or sponsor. The indicia of association 233 is a trademark, brand or logo associated with the partner and/or sponsor. The "brand" associated e-Critter 232 may also be used on an e-Critter card 130. This is shown in FIG. 20.

Under the "Parents & Teachers" link 156, there are a number of teacher specific menu options for use by a teacher of the child. By "teacher" is meant any one that is teaching a child; "teacher" includes parents, grandparents, aunts, uncles, friends, and leaders of boys' clubs and girls' clubs who teach a child. The teacher specific menu options provide ways of using the game 100 of the present invention as a teaching tool. Interested parents may also use the teaching tools of the teacher specific menu options to further enrich the child's experience with the game 100 of the present invention. The teacher specific menu options include menu options such as, lesson plans 234, financial lessons 236, other academic lessons 238, links to other lesson resources 240, tips on how to use the e-Critters in class 242, an e-Critter dictionary 244 and an explanation 246 on how to redeem Critter points for the school. The teacher is able to use the present invention as a teaching tool to teach the younger child personal values and financial responsibility utilizing the game 100 of the present invention, with the game-site operator providing the needed lesson plans 234, financial lessons 236 and other academic lessons 238 and links to other lesson resources 240. Thus, the younger child is taught personal values and financial responsibility in an environment where the risk of losing real dollars is removed.

Figure 18:
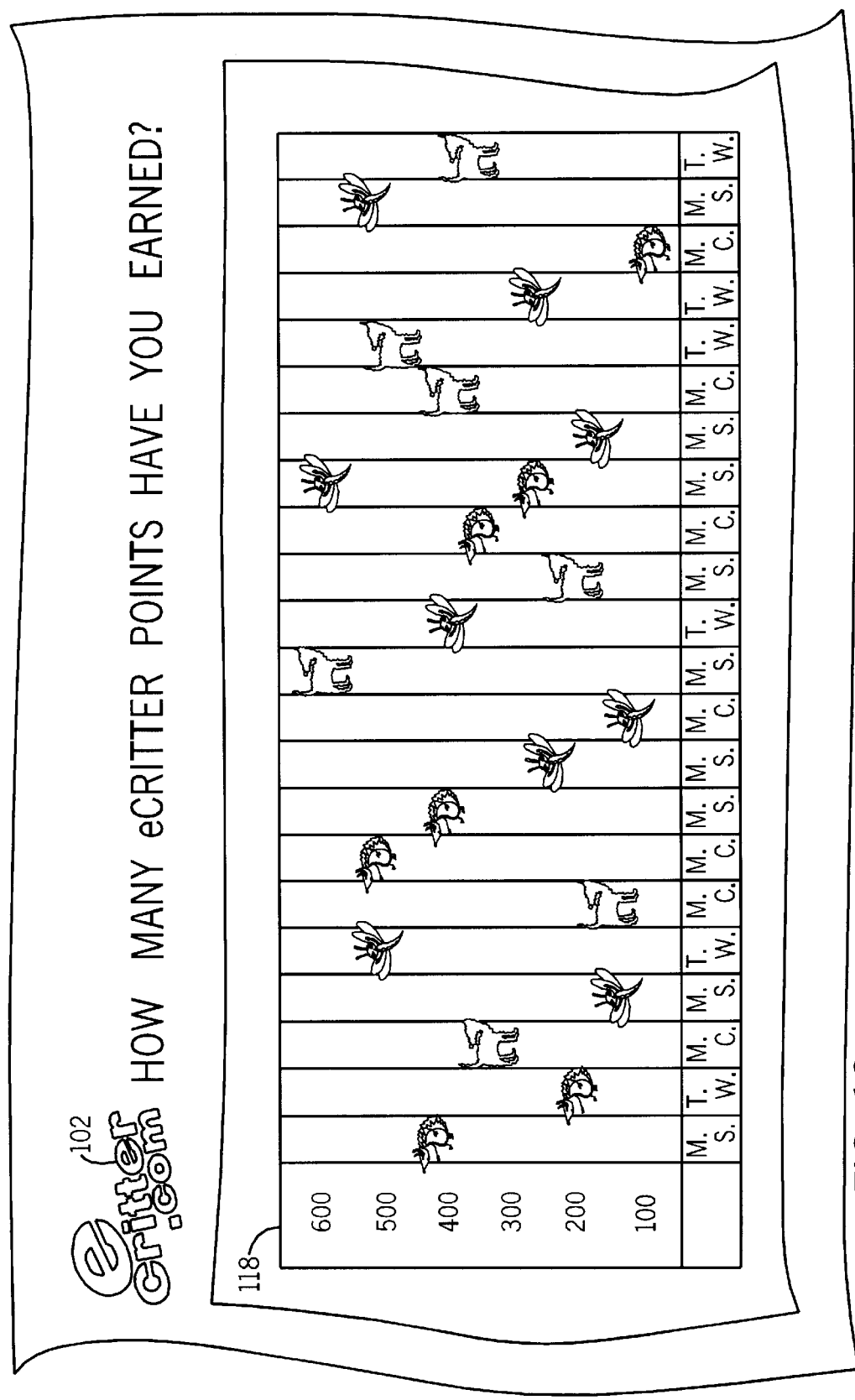
FIG. 18 illustrates how the game may be used in a teaching situation.

Under the tips on how to use the e-Critter in class 242, the teacher may also use the teaching tool as an incentive program to motivate the younger child by awarding the child with awards of a virtual collectible creature 120 and/or points 118. For example, the child may earn points 118 to be used in the game 100. The points 118 are distributed by the teacher to the child as awards for real world type activities, such as, but not limited to, reading books, completing extra credit homework assignments, or writing an adventure story based on the child's favorite e-Critter 120, or participating in public service activities promoting good citizenship, such as, visiting the elderly in a hospital or nursing home, or by participating in a community or neighborhood clean-up project, or by cooperating with police and learning general safety educational activities in the school. FIG. 18 illustrates how the game may be used in a teaching context in a classroom environment as a teaching tool. Here a number of children are competing for points and the teacher has a chart showing the children's progress.

"Community Place" Link

Referring back to FIGS. 1 and 2, the "Community Place" link 158 is a link to foster an exchange between the community and children by encouraging learning, responsibility, and compassion by providing a model for community service and giving the child an opportunity to participate in community service activities, as well as a way for the child to "earn" points 118 used in the game 100 of the present invention. The link 158 has a number of menu options including "schools" 250, "police" 252, fire department" 256, "parks" 258, as well as menu options to select for "critter sightings reports" 260, "locations" 262, "activities" 261 and "up-coming events" 263.

The "schools" menu option 250 provides information on school activities for the child to participate in and to earn points 118 for use in the game 100. These activities include reading books in a Summer Book Club or entering a storyteller contest. Points 118 are awarded for these activities.

The "police" 252 and "fire department" 256 menu options include activities for the child to participate in and earns points 118, such as by visiting the police station and/or the fire station to learn good citizenship and safety. The "parks" 258 menu option include activities for the child to participate in and earn points, such as by participating in community clean up and/or safety activities.

The menu options under the "Critter Sighting Reports" menu option 260 include mystery games for the children to play as well as games to try to locate or hunt for e-Critters. This menu option includes clues as to where the e-Critters may have last been sighted.

The menu options under "locations" menu option 262 include community maps or other maps to help locate the e-Critters that may have been sighted under menu option 260.

The menu options under the "activities" menu option 261 include activities for the child to participate in, and earn points, such as visiting elderly patients in a hospital and/or visiting the elderly in retirement homes. The "activities" menu option 261 include contacts, times, and locations to enable the child to do these activities.

The menu options under the "upcoming events" menu option 263 include information on the opportunities for the child to engage in one or more of the aforementioned community service activities.

"Privacy Info" Link

The "Privacy Info" link 160 is another link to the privacy policy as was described as a menu option under the "Parents & Teachers" link 156. The privacy policy is a policy consistent with federal child on-line privacy rules such as the COPPA (Children's On-line Protection & Privacy Act of 1998).

"Adventure & Games" Link

Figure 3:
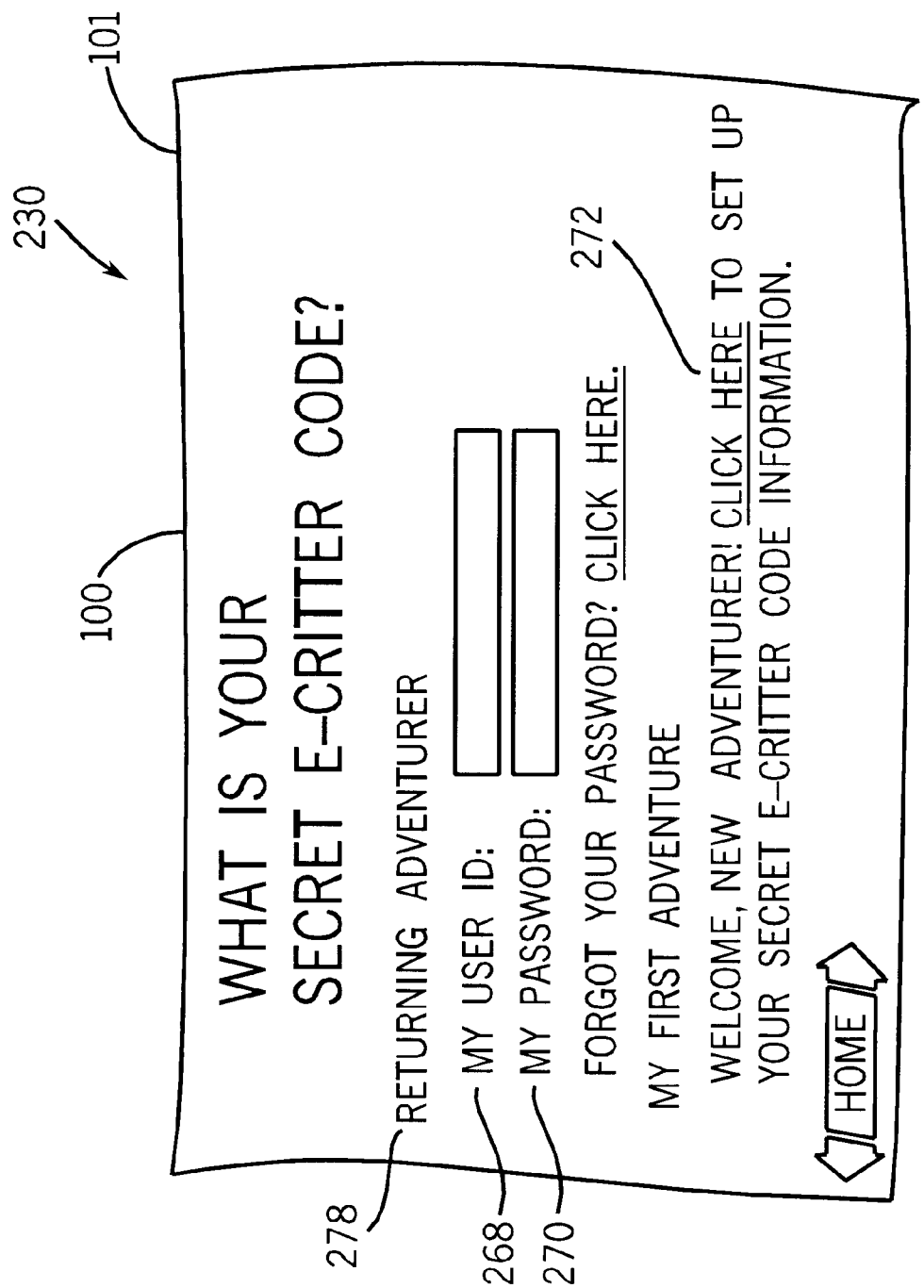
FIG. 3 is a log-in and enrollment screen display of the present invention.

The "Adventure & Games" link 162 is a link which allows the child to enroll and to begin to play the game 100 of the present invention. FIG. 3 is a log-in and enrollment screen display 230 of the present invention. The log-in allows the child access to the game site 101 and to any active on-line banking accounts the child may have. The link 162 enables a new game player (the child and/or the parent) to set up an on-line banking account 264 (hereinafter "account" 264) for playing the game 100. Demographic data is collected, as well as standard COPPA-complaint information. The child is identified as a "customer", and selects a user identification name, a user id 268, and a password 270.

this is the child's first time playing the game 101, the child selects a "My First Adventure" menu option 272 to set up the account. Here the child redeems any e-Critter cards 130 and discovers the value of the e-Critters 120 on the card 130. It is at this screen that the e-Critter card 130 may be used to transfer points 118 from the e-Critter card 130 to the child's account 264. To do this, the child merely enters the code 134 on the e-Critter card 130 into a portion of a menu requesting this information. This transfers the e-Critter identity from the card 130 to an on-line e-Critter 120 and may transfer any associated credits points 118 off the card 130 onto the account 264. The on-line e-Critter 120 is then useable in any of the environments available on the site, e.g., the "Critter Cave & Accounts" 164, the "e-Critter Playpen" 122 and the "Critter Chat Room" 167.

Alternatively, the parent sets up the electronic commerce (e-commerce) account 264 (hereinthroughout also, "E-money account" or "account", or "on-line bank account") for the child in the e-Critters website 101. The parent funds the account 264 with real money (funds) which become E-money in the present invention. The parent allocates a portion of the E-money in the account 264 for the child to purchase on-line e-Critters 120 and/or a portion of the E-money for the child to spend as "Crittercash Points" 118. All of the funds in the account 264 are available to the child through the child's password 270. All activities/transactions concerning the account 264 are recorded in the account information 128 and can be reviewed by the parent at any time.

The funds in the account 264 may be used by the child to purchase items on sponsors' sites 142 and/or partners' sites 144. This type of transaction mirrors that of other on-line money transactions, but gives the parents the ability to control and monitor the on-line spending of their children.

The child (or parent) starts by purchasing E-critters 120 on-line or by purchasing a starter kit, containing various on-line e-Critters 120. Yet alternatively, the child enters the "Adventure & Games" 162 screen and plays the game 100 of the present invention and accumulates one or more e-Critters 120 and/or one or more points 118.

The enrollment process establishes the child as an e-Critter customer. Once enrolled, the child selects or is given a user ID 268 and a password 270. When the child returns to play the game 100 of the present invention, he/she merely enters the user ID 268 and the password 270 in a "Returning Adventurer" 278 section of the enrollment screen display 230. The game site 101 verifies the child as an e-Critter customer and brings up a first adventure screen display 282.

Figure 4:
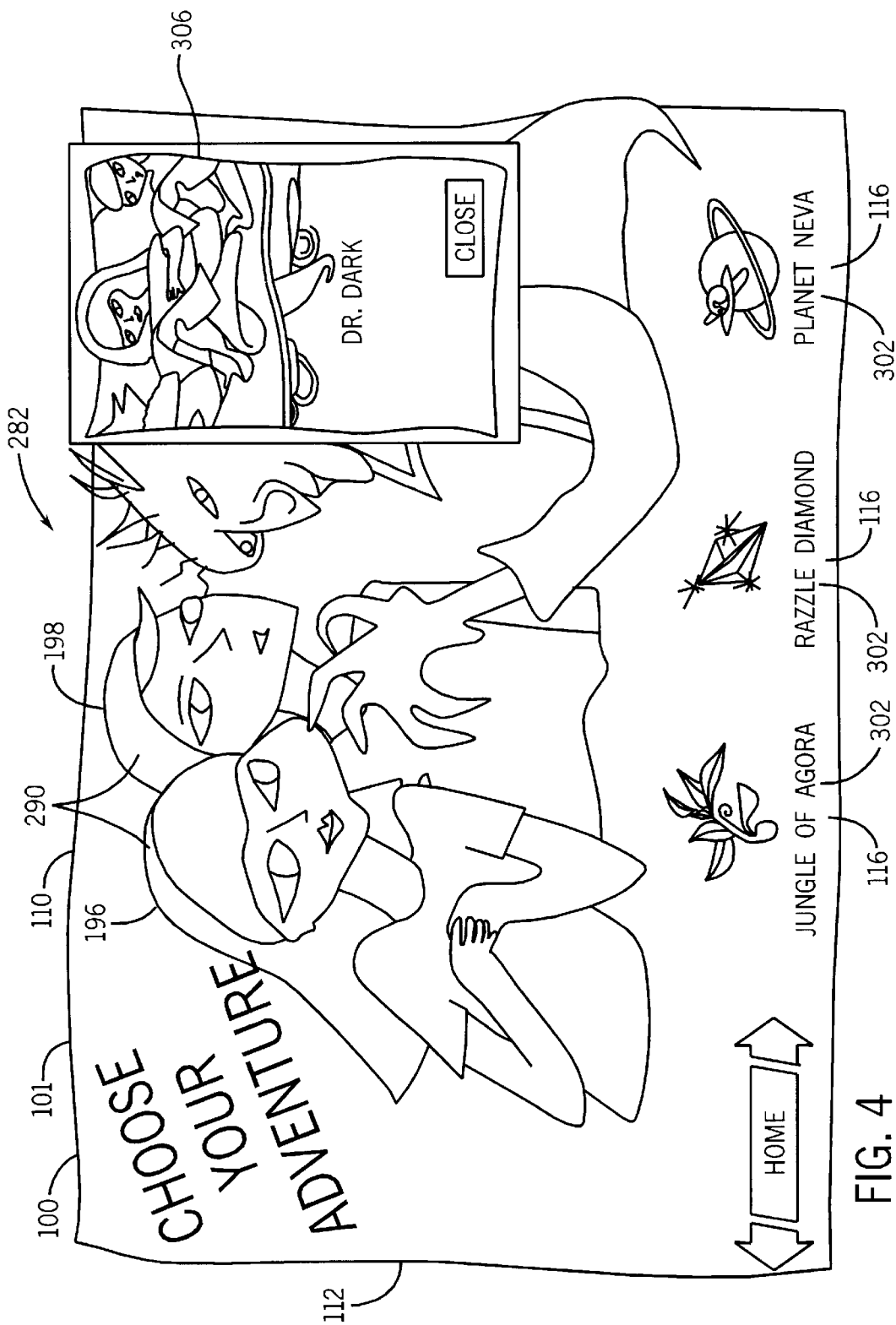
FIG. 4 is a first adventure screen display of the present invention.

Turning now to FIG. 4, the first adventure screen display 282 of the game 100 of present invention begins with the introduction of a cast (set) of the e-Critter characters 192. The e-Critter characters 192 are of two types: primary characters 290 in the adventure story activity 112 and virtual companion characters 300 (hereinafter "companion(s)"). The adventure story activity 112 has a number of selectable story elements 116 to a story line. The elements 116 are typically an adventure 302 (hereinafter also, adventure story), the companion 300 and an adventure vehicle 304 (or pod). The adventure story activity 112 is interspersed with a "game activity" 301. As the child progresses through the adventure story 302 and adventure story activity 112 and the game activity 301, the child accumulates one or more points 118 and/or one or more e-Critters 120.

The adventure story activity 112 has an animated storyline with physical dexterity games and/or educational activities interspersed throughout a narrative. The animated storyline uses known, in the art, animation techniques other efficient and affordable technology which is known in the art may also be used for the animated storyline. A new adventure story 303, 305 is introduced each month. Existing stories are refreshed weekly with new animations. The child must successfully complete the physical dexterity games and/or educational activities of the game 101 of the present invention to advance to the end of the adventure story activity 112.

The primary characters 290 and the companions 300 are complicated characters with pasts, preferences, skills, character strengths and weaknesses. The same set of e-Critter characters is used in all of the adventure story activities 112.

The physical dexterity games are just for fun to keep the child engaged in the game 100 of the present invention. Through the educational activities, e.g. educational games, the child learns financial concepts while playing, without knowing he/she is learning. The child is also taught personal values such as teamwork, cooperation and ethics through identification with e-Critter characters of the adventure story.

The child wins a virtual e-Critter 120 each time he/she plays. The child also earns "Crittercash Points" 118 for successfully completing physical dexterity games and/or educational activities within the storyline.

To begin the adventure story activity 112, the child moves the cursor over images of the primary characters 290 on the screen display 282 to find out additional information about the primary characters 290. A pop-up screen 306 appears with the information. At the bottom of the first adventure screen display 282 are a number of adventures 302. The child selects one of the adventures 302.

Figure 5:
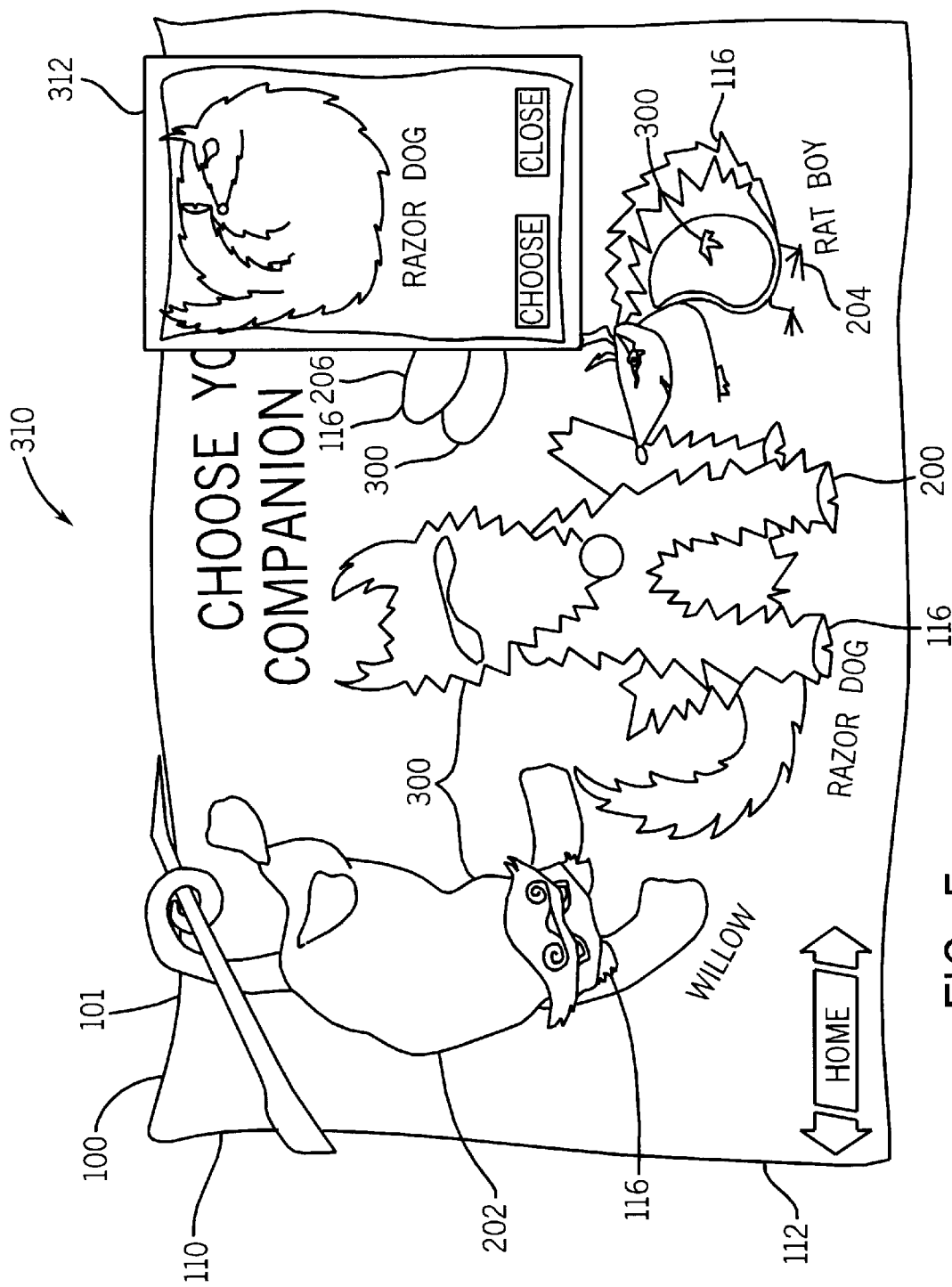
FIG. 5 is a second adventure screen display of the present invention.

Referring now to FIG. 5, a second adventure screen display 310 of the game 100 of the present invention illustrates the choice of a companion 300 to accompany the primary characters 290 on the adventure 302. When the child moves the cursor over one of the companions 300, a pop-up screen 312 appears with information about the companion 300. The child selects one of the companions 300. Selection of the companion 300 affects the path of the story and success of the adventure 302.

In a preferred embodiment of the present invention as best shown in FIGS. 1, 4 and 5, the set of the e-Critter characters 192 are Allie 196, Matt 198, Razor Dog 200, Willow 202, RatBoy 204, and Queenie 206. Allie 196 and Matt 198 are primary characters 290. Razor Dog 200, Willow 202, RatBoy 204 and Queenie 206 are companions 300.

Figure 6:
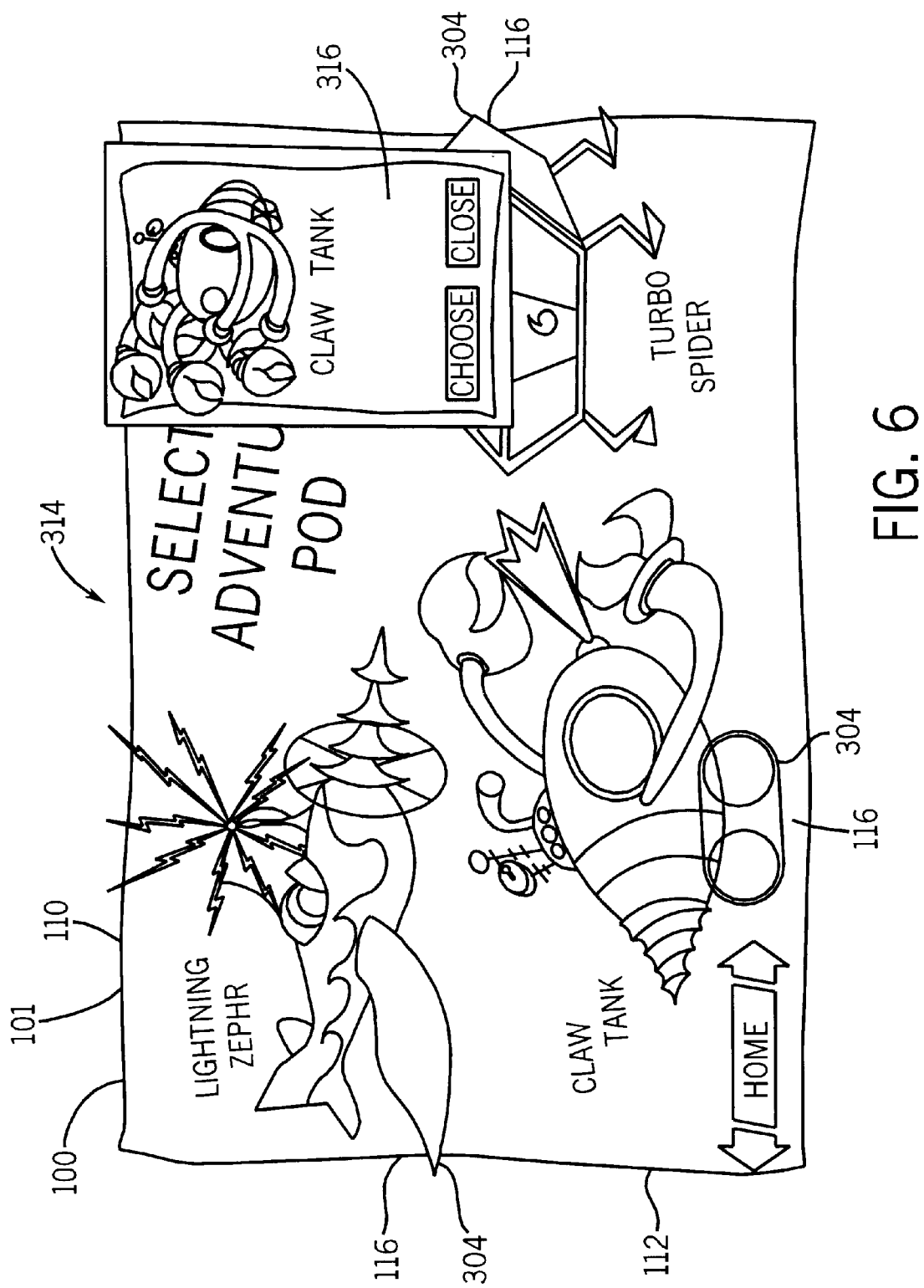
FIG. 6 is a third adventure screen display of the present invention.

Turning now to FIG. 6, a third adventure screen display 314 of the game 100 of the present invention illustrates a choice of the adventure vehicle (pod) 304 to use in carrying out the adventure 302 of the adventure story activity 112. Success of the adventure 302 is directly tied to the selection of the proper adventure vehicle 304. When the child moves the cursor over one of the adventure vehicles 304, a pop-up screen 316 appears with information about the adventure vehicle 304. The child selects one of the adventure vehicles 304. The child may take alternate paths dependent on the adventure vehicle 304 selected.

The adventure 302 is animated and preferably has movie portions and sound portions to engage and stimulate the child. The movie portion can be one screen which is comprised of several movies, or several screens with one movie. This is done using a commercial computer software program relating to music and animation. Examples of such software programs are the FLASH® program and the DIRECTOR® program. FLASH® and DIRECTOR® programs are products of Macromedia, Inc., San Francisco, Calif. There is an "explore portion" to the adventure 302 which uses animation created by the FLASH® and DIRECTOR® programs. The adventure may include an "Explore and Decide" screen. The "Explore and Decide" screens have hidden information in them which must be uncovered by the child and remembered by the child in order for the child to finish the adventure.

Periodically, the game activity 301 is inserted within the adventure story activity 112. The game activity 301 includes, but is not limited to, one or more physical dexterity games 318 and/or one or more educational activities 320. The physical dexterity game 318 includes game(s), which entertain the child and maintain the child's interest in the game. The physical dexterity games 318 awards an e-Critter 120 and may also award points 118 to the child. Preferably, the game activity 301 is followed by a pop up screen 317 revealing an award 138. The child must successfully complete the game activity 301 before advancing to the next screen in the game 100 of the present invention.

FIG. 7 is a screen display 322 illustrating a physical dexterity game 318 called "Catch the Mine Monsters" and an award 138 of a virtual collectible creature 120 and points 118. In the preferred embodiment, referring to the pop-up screen 317, the virtual collectible creature 120 is a "Zippy" e-Critter 324. The virtual collectible creature 120 has an artificial intelligence characteristic and a characteristic mimicking a financial instrument. The "Zippy" e-Critter 324 acts playfully and interactively and mimics a credit card. The screen display 322 of FIG. 7 is a static screen.

The educational activity 320 is a word game, preferably a word game of the question and answer type. The question and answer type word game is a game where a series of questions are posed and the child selects an answer to each question. If the child's answers to all questions are correct, the child is awarded with an e-Critter 120 or with an e-Critter 120 and points 118. If the child answers incorrectly, the child is provided with a correct answer, thereby teaching the child the correct answer. The word game explains a financial concept.

Figure 8:
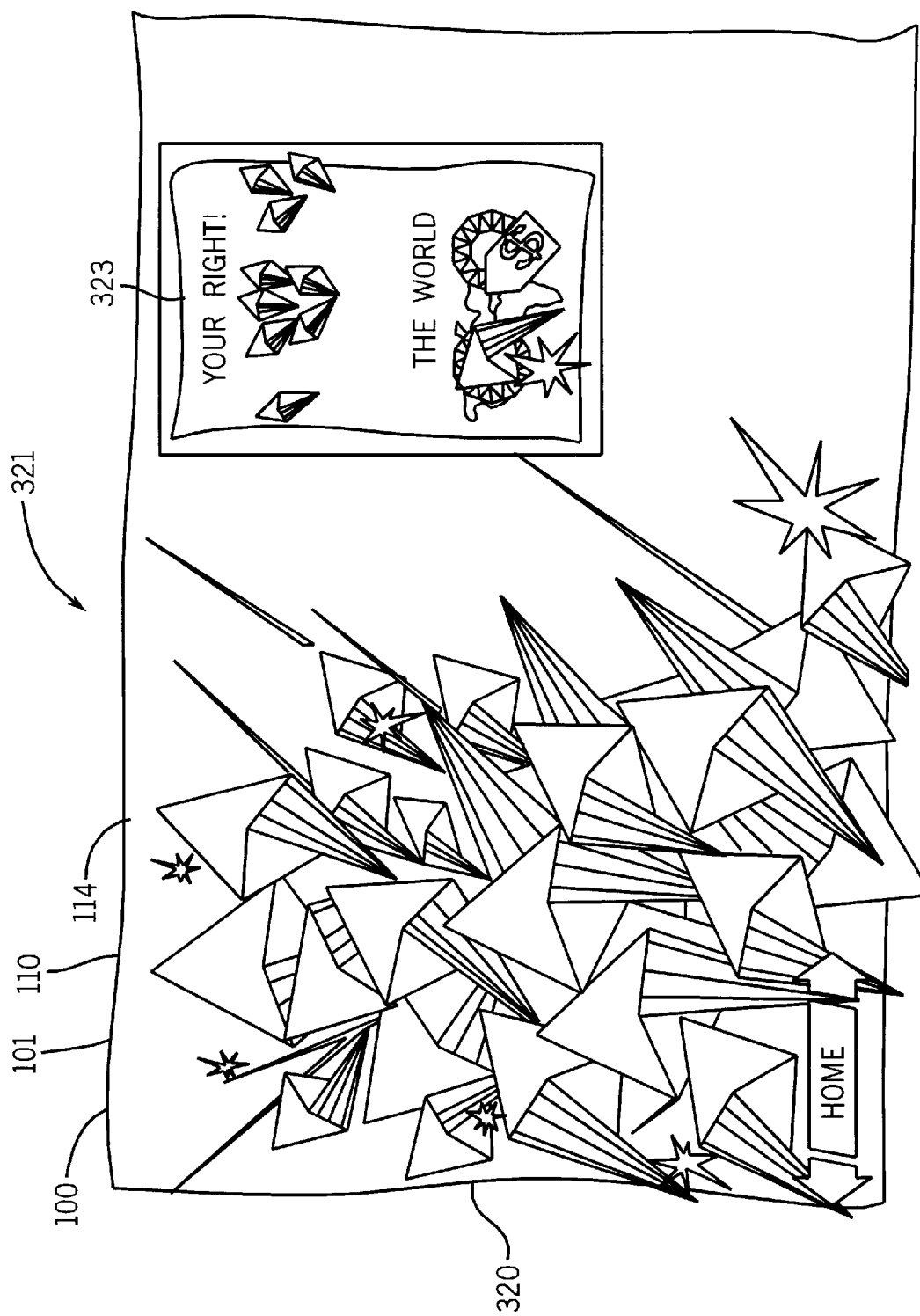
FIG. 8 is an educational activity screen display of the present invention.

FIG. 8 is an educational activity screen display 321 of the game 100 of the present invention illustrating an educational activity 320, in this instance, a word game explaining the financial concept of scarcity in respect to the commodity of diamonds. A pop-up screen 323 tells the child whether or not the child was successful. If unsuccessful, the child is given more instruction on the financial concept, and allowed to retry the question. For successfully solving the educational word game, the child is awarded a virtual e-Critter 120 and/or a number of points 118.

After successfully completing the entire adventure story activity 112 of the game 100, the child is given an award 138. FIG. 9 is a screen display 329 of the game 100 of the present invention illustrating an assignment 117 of an award 138 of a virtual collectible creature (e-Critter) 120 and points called "Crittercash Points" 118 to the child. In a preferred embodiment of the invention, best shown in FIG. 9, the awarded e-Critter is named "Zippy" 324 and the child receives 23 Crittercash Points 118 for successfully completing the game. "Crittercash Points" 118 are points 118 awarded in the game 100 of the present invention which are invested, by the child, in ways that mirror the real economy and have real risk and rewards associated with the choices. The screen display 325 invites the child to visit the "Critter Cave" 332.

By clicking on an arrow to the "Critter Cave" 332, the child is taken out of the completed adventure story activity 112 in the "Adventure and Games" link 162 and enters the "Critter Cave & Account" link 164. Link 164 can also be entered off the Home Page screen 140 as shown in FIG. 1. "Critter Cave & Account" Link As best shown in FIG. 2 and in FIG. 10, a screen display 348 of the game 100 of the present invention shows the link called "Critter Cave & Account" 164. At link 164 the child selects from a number of menu options. The menu options include "Enter Cave" 350, "Scores & Stuff" 352, "Critter Playpen" 122, and "Critter News" 356. The child can select menu option 350 to enter the "Critter Cave" 332 or the child can access the child's account information at "Scores and Stuff" 352, or get an update on news (new and interesting facts) about the e-Critters 120 and/or do additional research on the e-Critters 120 at "Critter News" 356, or play with the child's e-Critters 120 by accessing the link called "Critter Playpen" 122. In "Critter Playpen" 122 the child discovers a place (e.g. a cave environment) where the child's e-Critter collection 409 are kept. The child plays with the e-Critters 120 (like playing with a virtual pet) in a virtual environment in the "Critter Playpen" 122. The child may display a virtual collection of the child's e-Critter collection in the Critter Playpen 122.

Alternatively, once the child has purchased e-Critters 120 on-line or otherwise collected a sufficient number of e-Critters via collecting e-Critter cards 130, the child is able to enter the "Critter Playpen" 122.

Figure 10:
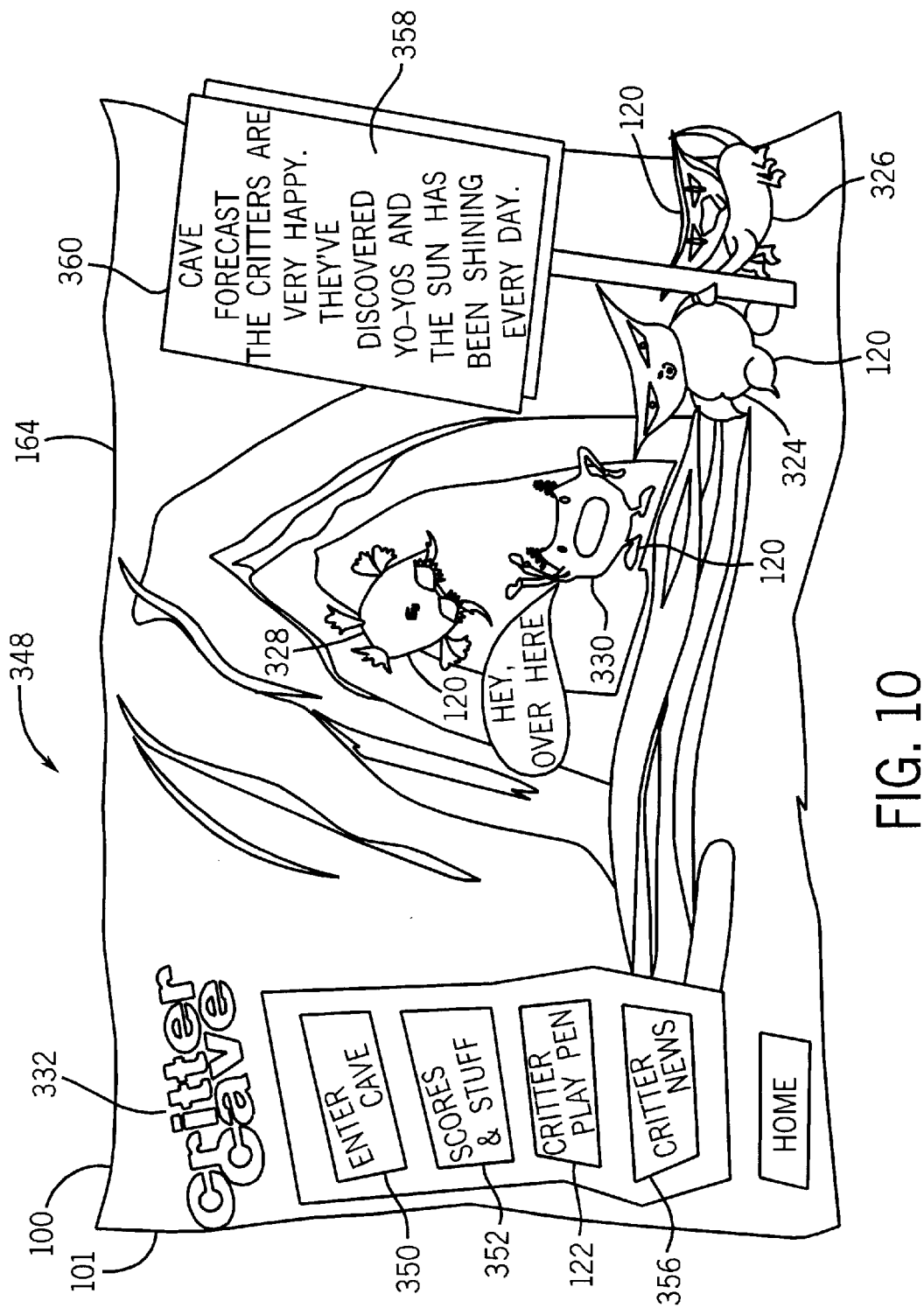
FIG. 10 is a screen display of the present invention, illustrating indicia associated with financial instruments.

The "Critter Cave & Account" screen display 348, as shown in FIG. 10, has indicia 358 associated with financial instruments, given in a "Cave Forecast" section 360. This indicia (or information) 358 may affect the rise and fall of the child's points (Crittercash Points) 118. The "Cave Forecast" section 360 encourages the child to research his/her investments and analyze the risks involved in their choices. To encourage this behavior, the "Cave Forecast" section 360 provides an overview of the cave environment.

One or more e-Critters 120 are displayed on screen display 348. Preferably, screen display 348 shows four e-Critters 120. They are Zippy 324, Tip-Toe 326, Zig-Zag 328, and Stingy 330. E-Critter 326 acts like a certificate of deposit. E-Critter 328 acts like a money market account. E-Critter 330 acts like a mutual fund. New e-Critters may be added and old e-Critters taken out of service.

Figure 11:
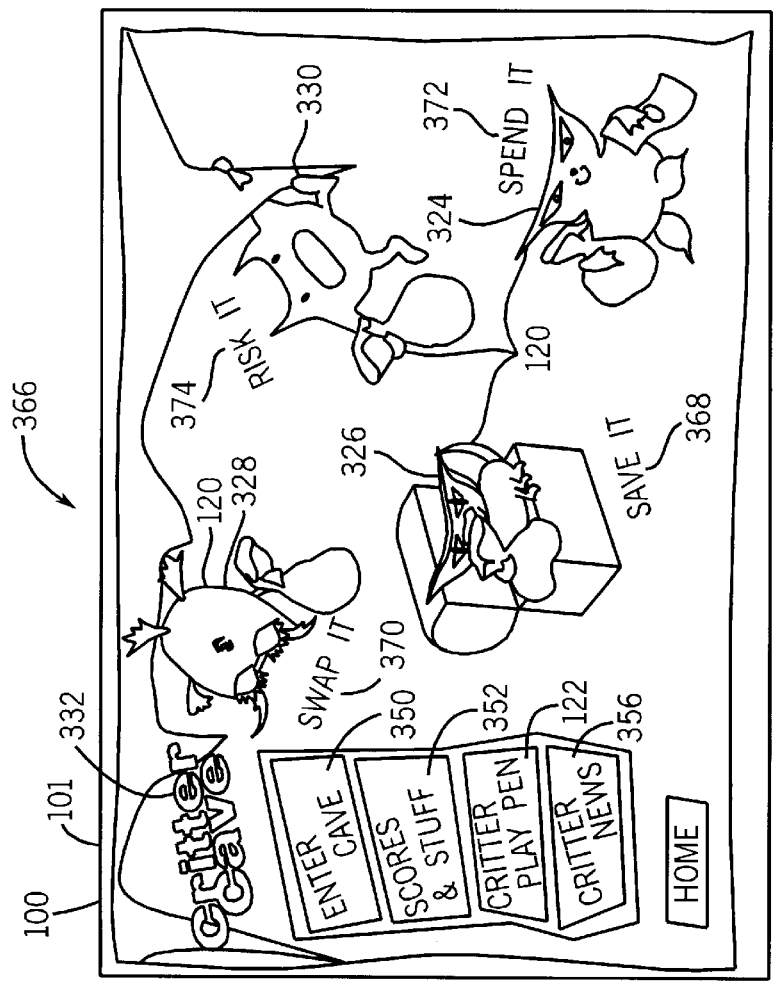
FIG. 11 is a screen display of the present invention, illustrating the activities the child may select for using points.

Zippy is attached to the "Spend It" choice on FIG. 11. The artificial intelligence characteristics associated with the Zippy e-Critter 324 include the following: fluctuations in size, color and activity, becoming bloated and then shrinking, sometimes agile, sometimes slow, sometimes brighter in color, sometimes dimmer. Zippy 324 generally moves quickly, ping-ponging around, sometimes he stays still and then flings unexpectedly. Zippy is spontaneous, inattentive and unpredictable. Zippy exhibits immediate gratification buying goods and delaying payment for them becoming shackled with debt.

Financial characteristics of a credit card include freedom for the user to spontaneously and quickly and perhaps greedily purchase goods/services, freedom to delay payment for the goods/services, freedom to spread out payments to make good/services affordable over time and freedom to establish a credit history. As debt on the credit card grows, money (interest charges) become more expensive.

Zippy 324 exhibits artificial intelligence characteristics and the financial characteristics of the credit card by moving quickly around the Critter Playpen, by acting spontaneously with other e-Critters and friends. Zippy 324 grows physically in size when debt increases; like an increasing credit card balance, he gets bigger and slower. Like a decreasing credit card balance, Zippy 324 shrinks physically in size when debt decreases, he becomes faster and more nimble. Zippy 324 exhibits happiness or sadness in expressions and posture. Zippy 324 acts confrontationally toward Tip-Toe 326, the e-Critter associated with the "Save It" choice. Zippy 324 can be a bully, laughing and mocking others, acting impatiently, and exhibiting greed from time to time.

The e-Critter Tip-Toe 326 has artificial intelligence characteristics of cautiousness, slow movement, safety, low risk tolerance, conservativeness, shyness, slow and steady behavior, honesty, reliability, predictability, dependability, friendliness, pleasantness and even temper. Tip-Toe 326 is a planner and is attached to the "Save It" choice. Tip-Toe 326 is slow to trust, but loyal, very shy moving away from other e-Critters, he mumbles a lot and huddles in corners, clings to objects and hides. Tip-Toe also counts his toes.

The financial characteristics of a certificate of deposit (CD) include safety in an insured investment, slow, steady and predictable increase in the investment with predetermined interest and time-bearing accounts. CD's have lower risk and low rewards than riskier investments such as mutual funds, stocks and bonds. CD's are usually not redeemable at will and there is a penalty for cashing them in before the CD matures.

Tip-Toe 326 exhibits the following artificial intelligence characteristics and CD-like characteristics: Tip-Toe stays alone, hiding behind things and acts shyly with his friends. Tip-Toe hums to himself and keeps himself company but becomes a loyal, dependable friend over time by working hard to accomplish goals and by helping others. Like the CD, Tip-Toe is slow, steady and predictable. Tip-Toe avoids certain other characters, particularly Zippy 324 who mimics a credit card.

The e-Critter Zig-Zag 328 is attached to the "Swap It" choice. Zig-Zag has a number of artificial intelligence characteristics including being misunderstood, moving moderately, having vision and being optimistic about the future, being cautious sometimes and more aggressive other times, being predictable but willing to take chances, being cheerful, light-hearted, smart, secure, likeable, friendly, flexible and balanced, being able to juggle effectively, being able to move from group to group and developing relationships quickly.

Financial characteristics of a money market account (MMA) are payment of moderate interest, liquidity and flexibility, moderate risk and moderate reward. The money market account can be used for purposes of saving or for purposes of spending money therein.

Zig-Zag 328 exhibits the following artificial intelligence characteristics and MMA-like characteristics: staying amused by life, never standing still, but swaying back and forth (flexibility), being easily distracted, following the crowd, being momentarily bedazzled by most recent friends, then moving on, not worrying, hanging upside down from the Critter Cave, watching others and observing, being everyone's friend, and being non-opinionated, fitting in everywhere, and similar to a MMA, Zig-Zag 328 acts in a flexible and moderate manner.

The e-Critter Stingy 330 is attached to the "Risk It" choice. Stingy 330 is characterized by the following artificial intelligence characteristics: Stingy 330 is a tough guy, a real curmudgeon who moves very fast, very speedy, taking big chances, but does not want to be wrong so he researches and analyzes. Stingy 330 is a brash, aggressive, supremely confident e-Critter, frustrated by the world's ineptitude, wanting what he wants when he wants it. Yet, sometimes Stingy 330 is unaware of the consequences associated with extreme risk and is never satisfied with ordinary results, Stingy 330 is impatient, never satisfied, never having enough time, never taking no for an answer. Stingy 330 is self-centered, selfish, very successful, brilliant and works really hard.

The financial characteristics of a mutual fund include high risk with potential high rewards. Mutual funds are an investment vehicle that pools money from investors to buy a wide range of stocks, bonds and/or money market instruments to help the mutual funds investors achieve their investment objectives. Because of the high risk, the investment of monies into a mutual fund may have harsh consequences, especially since the monies are not insured. Counter to the high risk of the mutual fund is the flexibility and sometimes ease of liquidity of a mutual fund investment.

Stingy 330 exhibits the following artificial intelligence characteristics and mutual fund-like characteristics. Stingy 330 hangs around the roof of the Critter Cave and kicks around, acts out at other e-Critters by yammering, pontificating and showing off. Yet, Stingy 330 leads the other e-Critters by working hard and taking risks, by blaming himself, not others, if something goes wrong, by contributing to the e-Critter community and getting things done. Like a mutual fund, Stingy 330 is a loner exhibiting great confidence, trusting only himself, showing no pity, taking no pity and by moving rapidly, without caution.

By clicking on "Enter Cave" 350, a screen display 366 appears that provides the child with activities for using the points 118. FIG. 11 is a screen display 366, which illustrates financial concepts taught as part of the game 100 of the present invention. The child has financially related choices (or activities) to consider for using the points 118. These financially related choices include, but are not limited to, saving the points 118, risking the points 118, spending the points 118 or swapping the points 118. These choices are listed as "Save It" 368, Risk It" 370, "Spend It" 372, and "Swap It" 374 in FIG. 11. In the "Swap It" 374 choice, the child may also display the child's virtual collection of e-Critters and may also swap an e-Critters from the child's collection of e-Critters. As the child points to a choice 368, 370, 372, or 374, the child is given information about the financial consequences of that particular choice. The consequences appear as pop-up screen displays 376, 382, 384 and 386 best shown in FIGS. 12–15.

In the game choices 368, 370, 372, 374 the child made in the Critter Cave, the child can invest points for awards or other consequences. The child is taught investment strategy and practices making financial decisions in the context of the game 100. The child learns about risky investments and the good records and bad consequences of such choices.

Figure 12:
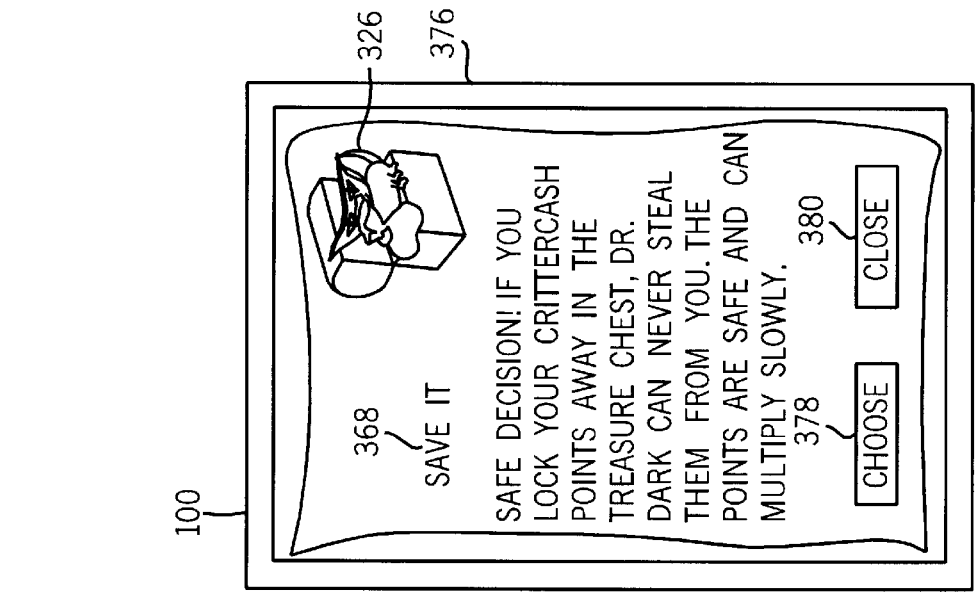
FIG. 12 is a pop-up screen display of the present invention, illustrating information provided for the activity of saving points.

FIG. 12 is a pop-up screen display 376 of information provided for the choice of saving the points, in the "Save It" choice 368. The child is given an explanation of what consequences a financial decision of investing points 118 in a "Save It" choice 368 means. Associated with the "Save It" choice 368 are virtual safe investments that act like a traditional savings account or a money market account. The child can select the "Save It" choice 368 by clicking on "Choose" 378, or can close this choice by clicking on "Close" 380 and investigate the remaining choices.

Figure 13:
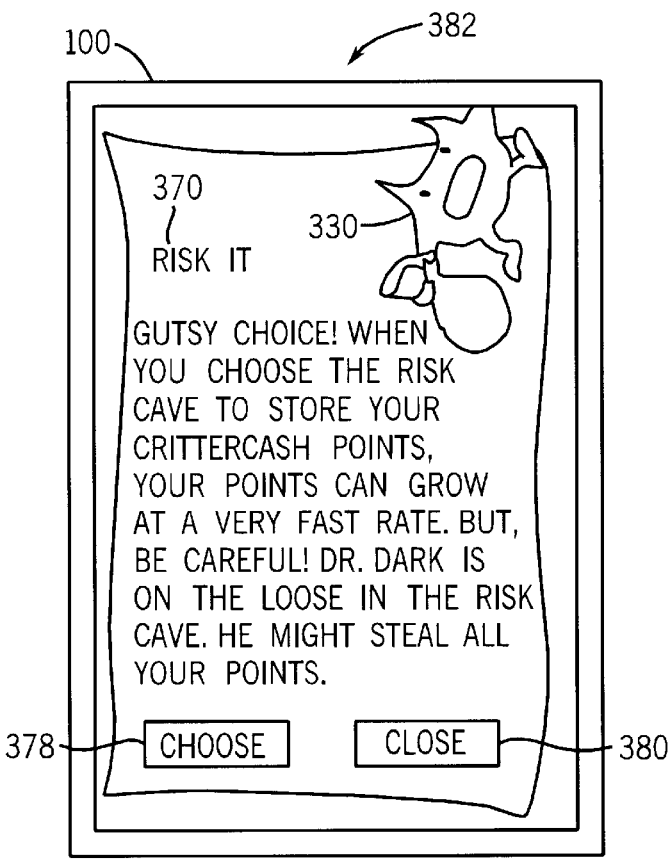
FIG. 13 is a pop-up screen display of the present invention, illustrating information provided for the activity of risking points.

FIG. 13 is a pop-up screen display 382 of information provided for the choice of risking the points 118, in a "Risk It" choice 370. Associated with the "Risk It" choice 370 are virtual risky investments. The risky investments are tied to a standard financial index, such as the S&P 500 financial index. The child is given an explanation of what consequences a financial decision of investing points in a "Risk It" choice 370 means. The child can select the "Risk It" choice 370 by clicking on "Choose" 378 or can close this choice by clicking on "Close" 380 and investigate the remaining choices.

Figure 14:
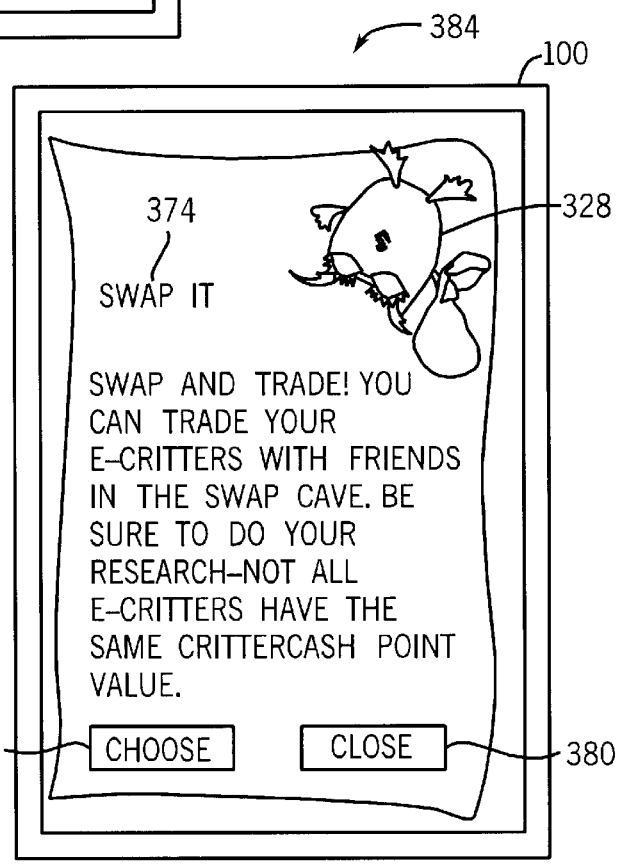
FIG. 14 is a pop-up screen display of the present invention, illustrating information provided for the activity of swapping points.

FIG. 14 is a pop-up screen display 384 of information provided for the choice of trading any of the child's e-Critters 120 in a "Swap It" choice 374. The child may also include e-Critter Cash points 118 in the trade. The "Swap It" choice 374 opens up a virtual trading field, a "Swap Cave", within the Critter Cave 332 for the child to view which e-Critters 120 are listed for trade by other children. The child adds his/her name to a trade list and notes what e-Critter 120 the child is willing to trade for an e-Critter 120 of another child. Children electronically trade e-Critters 120 with each other in the field. The child is able to communicate with the other child to thank him/her for the trade.

The child may take the e-Critter 120 to a virtual sales area in the Critter Cave to trade one e-Critter 120 for another e-Critter 120 or to redeem the e-Critter 120 for redeemables such as discounts and/or merchandise from sponsors 106 and/or partners 108. The child can choose the "Swap It" choice 374 by clicking on "Choose" 378 or can close this choice by clicking on "Close" 380 and investigate the remaining choices.

Figure 16:
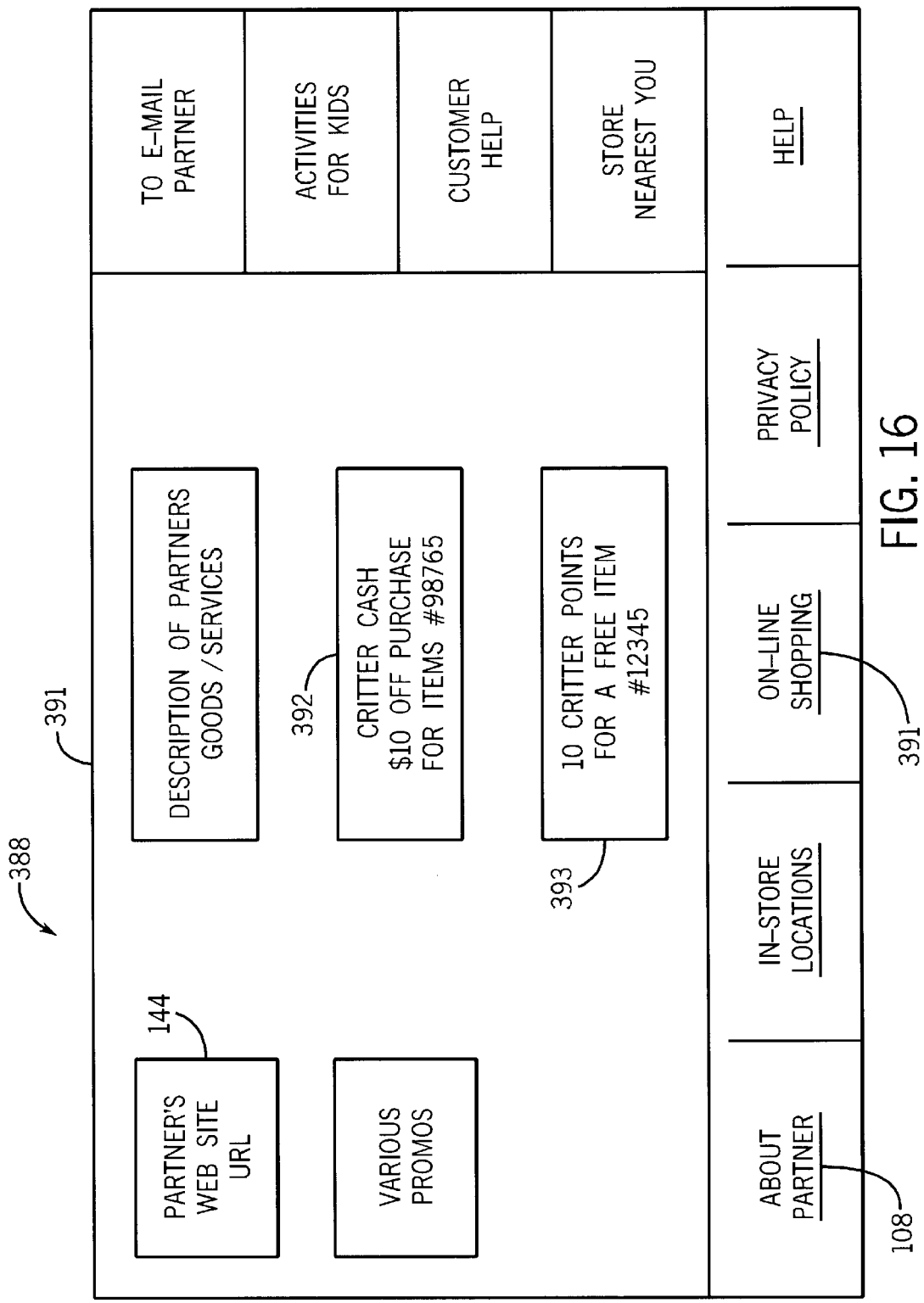
FIG. 16 is a generalized screen display of the present invention, illustrating how the game is linked to on-line shopping.

FIG. 15 is a pop-up screen display 386 of information provided for the choice of spending the points 118, in a "Spend It" choice 372. By selecting the "Spend It" choice 372 the child has the option to buy merchandise (real goods) at one of the partner's sites 144. The child can select this choice 372 by clicking on "Choose" 378 or can close this choice by clicking on "Close" 380 and re-investigate the remaining choices. When the "Spend It" choice 372 is made, the child is linked to the "Go Shop!" link 166 to a partner's website 144 having an on-line-shopping service. FIG. 16 is an example schematic type screen display 388 of the game 100 of the present invention illustrating how the game 100 is linked to an on-line shopping service 390 of a partner 108 offering the child a real money discount 392 on merchandise and/or giving the child free merchandise 393. The real money discount 392 is based on a number of points 118 the child accumulates and is willing to spend for discounts on merchandise or for free merchandise.

The child is able to purchase items on-line or in-store at physical locations of the sponsors 106 and/or partners 108.

For example, the child may use a Kiosk at a physical location of the sponsor 106 and/or partner 108 to redeem Crittercash Points 118 and/or e-Critters 120 for discounts and/or merchandise and/or services.

Returning back to FIG. 10, the child is able to review his/her account information 128 by clicking on the "Scores & Stuff" link 352. This links the child to the child's account information 128, as best shown on an account screen display 402 in FIG. 17. In reviewing the account information 128, the child is able to see a historical view of his/her account 264 and carry out transactions on his/her account 264. The account information 128 is used by the child to deposit points, track performance, calculate gains, calculate losses, allow withdrawals to spend points and allow transfers (1 to 1) between investments.

The account information 128 includes a number of indicia, including a score information section 404 for recording score information on the adventure story activity 112 played by the child, an investment portfolio section 406, and a collectibles section 408 for tracking a child's collection of e-Critters 409. The score information section 404 may include, but is not limited to, a date 412 the child played the game, a name 414 of the adventure 302 selected, the points 118 scored in the adventure story activity 112 and a updateable total (or tally) 418 of points. The investment portfolio section 406 includes a breakdown of accounts into risky investments ("Risk Investments") 420 and safe investments ("Save It Investments") 422 selected by the child, dates 424 of investments, a deposit amount 426 (the amounts of points 118 deposited into those accounts 420, 422), any gains 428 or losses 430 on the investment of the points 118 and an updateable total of the investment points 432. The type of account information shown here is in the nature of credits and deposits to the account 264, and debits to the account 264. The account information 128 teaches the child about performance of an investment, calculation of gains and losses, effects of transfers from one investment to another, and the consequences of withdrawals.

Referring again to FIG. 17, in a preferred embodiment the account information 128 shows, 26 points are won in a game played Mar. 1, 2001 and deposited into a risk investment which appreciates in value to 29 points on Apr. 1, 2001. And 25 points are won in the game played on Apr. 1, 2001 and invested in a Save It investment which appreciates to 27 points on Apr. 1, 2001 giving the child a total of 56 Crittercash Points 118 invested.

The account information 128 allows the child to transfer points 118 from risky to safe investments on a one to one basis and allows the child to withdraw points 118 to spend the points at the sponsor's site 142 and/or partner's site 144. Preferably the portfolio section 406 includes advice 440 about the market. The advice 440 about the market is financial advice designed to guide the child in selecting a choice for using the child's points 118. A tally 126 of total points is given to the child so that the child can keep track of the child's investments 420, 422 (risky and/or safe investments).

The collectibles section 408 of the account information is called "Collectibles", and tracks the child's collection of e-Critters 409. "Collectibles section" 408 lists a type of e-Critter 446 and a number of e-Critters 448 in the collection 409 and provides a link 450 to the "Critter Playpen" 122 where the child may play (or interact) with the e-Critters 120 like with a virtual pet in a virtual environment.

Referring to FIG. 17, in a preferred example, the "Collectibles" section 408 of the account information 400 discloses that the child has two e-Critters 120 (Zippy e-Critter 324 and Stingy e-Critter 330) in her e-Critter collection 409.

Referring back to FIG. 10, the child may select the "Your Cave" menu option 354 which links the child to the "Critter Playpen" 122 and to the child's e-Critter collection 409.

"Go Shop!" Link

Referring back to FIGS. 1 & 2, the "Go Shop!" link 166 provides links to one or more partners' websites 144 and/or to one or more sponsors' websites 142 who are willing to redeem e-Critters 120 and/or Crittercash Points 118 for merchandise and/or discounts via e-commerce. The "Go Shop!" link 166 also provides a menu option to go to the "Scores & Stuff" menu option 352 accessible from the "Critter Cave & Account" link 164.

For the partner 108 and/or the sponsor 106, their website (142, 144) presence on the game site 101 of the present invention increases product sales, expands a partner's relationship and/or a sponsor's relationship with the child. It also provides for use in marketing additional products such as, hats, T-shirts, soft toys, etc., by using an image of the primary characters 290 and/or the e-Critters 120 on those products.

The game 100 of the present invention incorporates "kid values" by providing adventure story activities 112, a set of characters 192, and virtual collectible creatures 120. The child develops an interest in the characters 192 and comes to care about them and wants to find out what happens to them. Also, the child plays the game 100 numerous times and is awarded one or more virtual collectible creatures 120. As the child becomes friends with the virtual collectible creatures 120, and attaches personal meaning to the virtual collectible creature 120, the child will work to obtain, collect and house the virtual collectible creatures 120 using the game 100 of the present invention.

The game 100 of the present invention incorporates the six distinct play activities (conquer, compare, create, commemorate, compete and construct). The child conquers or masters financial concepts by playing the educational activities of the game, by receiving his/her financial accounts and by making choices about using points. Financial concepts are taught in the adventure story activities, through the behavior of the characters 192, through accumulation of points 118, through investment of points 118, through reviewing account information 128 and through making real world choices using the points. The child compares or trades by making choices about using his/her points 118 and by electing to swap (trade) his/her e-Critters 120. The child creates or pretends during the adventure game events and also when the child elects to write stories about his/her e-Critters 120. The child commemorates by maintaining a collection 409 of his/her e-Critters 120. The child competes within the game 100 against him/herself by attempting to get higher scores of points 118 and/or collect more e-Critters 120. The child may compete against other children as the children compare collections of e-Critters 409 and/or points 118. The child constructs by building a collection of e-Critters 409 and/or points 118.

Another aspect of the present invention is a method of providing the game 100 of the present invention to the child. The method includes: (1) providing the aforementioned Internet-based game 100 to the child; (2) providing the child with access to the adventure story activity 112 and providing the child with the selectable story element 116 for the child to select; (3) providing the child with interactive game events 110 for the child to interact with and providing the child with the assignment of the award 138 for the child to receive where the award 138 includes the virtual collectible creature 120, and; (4) providing the child with account information 128 for the child to review.

To implement the enrollment 230 and the account information 128 of the game 100 of the present invention, the game site operator of the game site 101 of the present invention utilizes a web application server (hereinafter, "server"), known in the art web applications server software and known in the art accounting software to provide interactive and accounting features of the present invention. Together the software acts as a system (or a game engine).

When the child enrolls as a user, the accounting software receives a message from the server to create an e-commerce customer account 264. A check by the system is done to verify that the child is or is not an existing customer, e.g. has an account 264. If the child is an existing customer, the system requests the child enter his/her account identifiers, e.g. user ID 268 and Password 270, to access the game 100. If the child is not an existing customer, the system prompts the child to open an account 264, checks existing open accounts, assigns an account identifier, establishes a customer/account relationship and returns an open account identifier. The system also prompts the child for other information, e.g. for personal preference information.

The system generates an account history for the child. First the system validates the child's account status, and retrieves an account transaction history and an account balance information.

The system receives a message from the server to add points 118 when the child wins awards 138 and/or the parent adds money to the account (customer account) 264. The system verifies the account status, verifies the request to add points 118, updates the account balance, records the add points transaction and returns a confirmation and an account current balance. This is accessible to the child in the account information 128.

The system allows the child to withdraw points 118 (in the "Spend It" choice 372) to use in obtaining merchandise from a partner 108 and/or sponsor 106. The system receives a message from the server to withdraw points 118 from the child's account 264. The system verifies the account status and available balance of points, verifies the request to withdraw points 118, updates the account balance, records the withdrawn points transaction event. The system ensures that withdrawals do not result in a negative account balance.

The system allows the child to transfer points from one open account 264 to another open account of the child. The system receives a message from the server to transfer points 118 from one related customer account to another, verifying the account status and balance of points 118 transferred to ensure that a negative balance does not occur. The system updates the balance transfer in the other account, records the points 118 and corrects the balances in both accounts.

The system also calculates gains 428 and losses 430 for all open accounts 264 and adds or subtracts the results from the open account balances. This is done on a pre-defined daily basis at a pre-defined time and software automatically alerts the system to begin the process. The calculated account losses 430 cannot result in a negative account balance.

The system also maintains various control parameters for the accounting software, including daily manual updating of investment rates using the collectability/stock model and/or the system algorithm model. The parameters include those related to account types and group accounts. The game site operator updates the control parameters.

One skilled in the art will appreciate that the software necessary to create the on-line game site 101 and the software to incorporate the audio and visual portions of the game 100 and the selectable elements 116 and pop-up screens, and the on-line game operations is not complex or unusual. This may be performed by such software apparent to one of ordinary skill in the art, therefore no flow charts of the like are believed necessary or are included as part of the present disclosure.

Still another aspect of the present invention is a public relations tool for use by a financial institution to build relationships with families through education of the younger child in personal values and financial responsibility utilizing the game 100 of the present invention. The financial institution provides the on-line game 100 of the present invention to the younger child and is listed as a sponsor 106 having a sponsor site 142 and/or as a partner 108 having a partner site 144 in the game 100. The financial institution provides special offerings, such as, but not limited to: promotional merchandise, discounts, special youth accounts, sponsored activities, community activism days, and financial offerings to a child who plays the game 100 of the present invention. Alternatively, the financial institution redeems points 118 and/or e-Critters 120 won in the game 100 of the present invention for discounts on merchandise or for free merchandise (collectively, redeemables). Yet, alternatively, the financial institution provides one or more e-Critters 120 or one or more points 118, or one or more e-Critter cards 130 to the child playing the game 100 of the present invention.

Yet another aspect of the present invention is a marketing system between a sponsor 106 who is a financial institution and a partner 108 who is a retailer, utilizing the game 100 of the present invention. The present invention advantageously builds relationships with a family of a younger child and the financial institution and partner by providing the game 100 of the present invention to the family for the financial education of the younger child. The financial institution and the partner 108 are listed as sponsor 106 with the sponsor's website 144 and partner 108 with the partner's website 142 on the game website 101. The game 100 of the present invention is provided to a younger child though the auspices of the sponsor 106 (financial institution). Points 118 and/or e-Critters 120 awarded in the game 100 are redeemable by the partner 108 for discounts on merchandise and/or merchandise sold by the partner 108. The points 118 are redeemed at the website 144 of the retailer or at an in-store location of the retailer. The partner 108 (retailer) may pay the sponsor 106 (financial institution) a fee for listing as a partner 108 under the "Go Shop" link 166 and under the "Partner Info & Links" 220 under the "Parents & Teachers" link 156 of the game website 101.

For the partner 108 (retailer), this partnership increases product sales, expands the retailer's relationship with target demographics (the child), and enhances the relationship between the retailer's web presence 144 and the retailer's physical in-store location, with activities and offers that are unique to each, yet driving sales traffic between the two.

A further aspect of the present invention is a sales tool for a partner 108 who is a retailer to provide the retailer with a marketing campaign and a loyalty system of generating multiple new hobbies and continued interest through the inexpensive creation and replication of a virtual collectible creature 120 utilizing the game 100 of the present invention. In addition to redeeming e-Critters 120 and/or points 118 on the game site 101 of the game 100 of the present invention, or on a partner's website 144 on-line store, or at an in-store location, such as, at a kiosk at the participating retailer, the partner 106 also sponsors or brands individual e-Critters on the game site 101. Thus, for example, a popular food restaurant partner having its own trademark has an e-Critter utilizing the partner's trademark. This specialized e-Critter 120 is a "brand associated" e-Critter 232. Characteristics of the brand associated e-Critter 232 include: an artificial intelligence characteristic, a characteristic mimicking a financial instrument and an indicia of an association 233 with a particular partner 108. The indicia of association 233 includes a marking, trademarking, or branding identifiable with the partner 106. This sales tool can also be used by a particular sponsor 106 in a similar manner to create a "brand associated" e-Critter 232 for the sponsor 106. The indicia of association 233 includes a marking, trademarking, or providing identifiable with the sponsor. FIG. 20 illustrates a brand associated e-Critter 232, shown on an e-Critter trading card 130.

Yet still, another aspect of the present invention is to provide a partner 108 who is a retailer with a game 100 that is a means of supporting the educational goals of schools and parent while still promoting an individual marketing agenda of the retailer utilizing the game 100 of the present invention. The game 100 of the present invention supports the educational goals of schools and parents to teach the younger child financial concepts in an age appropriate manner. The retailer is listed as a partner 108 of the game 100 and provides an on-line site (partner's website 144) or in-store locations where points 118 are redeemed for discounts on merchandise or merchandise. The retailer selects the discounts and/or merchandise in accord with a marketing agenda established by the retailer. The retailer uses a computer kiosk in the retailer's store or other computer links to the web-based Internet game 100 of the present invention to access the child's account to verify the number of redeemable points 118.

In yet another embodiment, the present invention provides a near-money engine and a customer profiling application using the game 100 of the present invention. Near-money is defined in the finance industry as assets quickly and easily converted into cash. In this application, the Crittercash Points 118 are a type of near-money as the Crittercash Points 118 are able to be stored and traded for discounts on, or for goods and/or services of a partner 108 and/or a sponsor 106.

In order to record Crittercash Points 118 for each child, a unique e-commerce account 264 is maintained for the child by the game site operator. How the e-commerce account 264 is established has been discussed previously. This e-commerce account 264 is a customer profiling application of the child, collecting customer profile information that can be used by the partner 108 and/or sponsor 106 to develop a more meaningful relationship with the child. The account maintains the identity of the child, a record of personal preferences of the child, a record of the child's recent purchases with Crittercash Points 118 and a record of the child's preferences for goods/services. The customer profile information is used to deliver VIP (Very Important Person) information in-store and on-line from the partner 108 and/or the sponsor 106 to the child. For example, a child is issued a Smart Card from the partner 108 with the child's pertinent customer profile thereon. The child can swipe the card in the partner's store at a Smart Card reader or at a kiosk in the partner's store and be given special promotions based on his/her personal preference information, such as, but not limited to his/her interests, hobbies, likes/dislikes, community activism, and past purchasing records. The child could also receive product updates based on the child's customer profile information.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An Internet-based gaming system for teaching personal values and financial responsibility to a younger child, the gaming system comprising:

a set of computer interactive game events, the game events having an adventure story activity and an educational activity, the adventure story activity having a selectable story element;

a scoring system in playing the game events, the scoring system including an assignment of an award, the award including a virtual collectible creature, the virtual collectible creature having an artificial intelligence characteristic and having a characteristic mimicking a financial instrument, the financial instrument mimicked including a stock, or a bond, or a savings account, or a credit card, or a money market, or a certificate of deposit, or a mutual fund, or an investment, or interest, or a dividend, or taxation, or a debit card;

indicia of an account information associated with the child, the indicia of account information relating to the virtual collectible creature including an investment portfolio section and a collectible section for tracking a child's collection of the virtual collectible creature;

wherein, the child learns the characteristics of the financial instrument; and the child is taught investment strategy and practices making financial decisions in the context of the game.

2. The Internet-based game as defined in claim 1 further comprising:

a website of a sponsor supporting the game and redeeming the award won by the child in the game.

3. The Internet-based game as defined in claim 1 further comprising:

a website of a partner redeeming the award won by the child in the game.

4. The Internet-based game as defined in claim 1, wherein the award further comprises:

an assignment of points and wherein the indicia of account information further comprises information on a tally of the points and wherein the investment portfolio section includes an information on an investment of the points.

5. The Internet-based game as defined in claim 4 further comprising:

a website of a sponsor supporting the game and redeeming the award won by the child in the game.

6. The Internet-based game as defined in claim 4 further comprising:

a website of a partner redeeming the award won by the child in the game.

7. The Internet-based game as defined in claim 4, further comprising:

a selection of financial related choices for using the points.

8. The Internet-based game as defined in claim 7, wherein the financial related choices include a choice of saving the points, a choice of risking the points, a choice of spending the points or a choice of swapping the points.

9. The Internet-based game as defined in claim 1, the game also having a customer profiling application, including an enrollment procedure for accessing the game;
    wherein the award further comprises an assignment of points and
    wherein the indicia of account information further comprises an information on a tally of the points and wherein the investment portfolio section includes an information on an investment of the points;
    wherein the game further comprising a website of a sponsor, the sponsor supporting the game and providing redeemables for the award won by the child in the game;
    wherein the enrollment procedure collects a personal preference information from the child for use in accessing the game, and wherein the enrollment procedure collects the account information including an identity of the child, a record of spending of the points, and a record of the personal preference information of the child.

10. The Internet-based game as defined in claim 9, wherein the child is offered special promotions based on the account information of the child.

11. The Internet-based game as defined in claim 1, the game having associated with it a trading card having an image of the virtual collectible creature on the card.

12. The Internet-based game as defined in claim 11, the card further comprising indicia thereon, relating to information about the virtual collectible creature.

13. The Internet-based game as defined in claim 11, wherein the award of the game further comprises an assignment of points and wherein the indicia of account information of the game further comprises information on a tally of the points and wherein the investment portfolio section includes an information on an investment of the points and wherein the card further comprising a code on the card providing points for use in the game.

14. The Internet-based game as defined in claim 11, the card further comprising an indicia of a URL on the card, the indicia of the URL associated with an on-line game site for playing the game.

15. The Internet-based game as defined in claim 14, the card further comprising indicia of a sponsor and/or a partner of the game.

16. The Internet-based game as defined in claim 11, wherein the image of the virtual collectible creature on the card further comprises an indicia of an association with a particular sponsor and/or a particular partner.

17. The Internet-based game as defined in claim 1, wherein the selectable story element includes an adventure, a companion and an adventure vehicle.

18. The Internet-based game as defined in claim 17, wherein the game is a marketing system between a sponsor and a partner, the game includes a website of the sponsor and a website of the partner, the sponsor being a financial institution, wherein the sponsor provides the game to the younger child through auspices of the sponsor, the partner being a retailer providing discounts on merchandise and/or merchandise for redeeming the award of the game; wherein the award of the game further comprises an assignment of points and wherein the indicia of account information of the game further comprises information on a tally of the points; and wherein the investment portfolio section includes an information on an investment of the points.

19. The Internet-based game as defined in claim 17, wherein the game is a teaching tool for a teacher at a school; wherein the game further comprises a teacher specific menu option including a lesson plan, a financial lesson, a link to other lesson resources, a tip on how to use the virtual collectible creature in a classroom and a virtual collectible creature dictionary; wherein the award of the game further comprises an assignment of points, wherein the indicia of account information further comprises information on a tally of the points and the investment portfolio section includes an information on an investment of the points; and wherein the teacher specific menu option includes an explanation on how to redeem the points for the school.

20. The Internet-based game as defined in claim 17, the game further comprising a listing of an entity as a website of a sponsor or as a website of a partner site, and a listing of special offerings made available by the entity to the younger child who plays the game;
    wherein the award of the game further comprises an assignment of points and wherein the indicia of account information of the game further comprises information on a tally of the points; and wherein the investment portfolio section includes an information on an investment of the points,
    wherein, the entity provides the virtual collectible creature and/or points to the younger child who plays the game; and
    wherein the entity is a retailer listed as a partner in the game, the retailer providing an on-line site or in store location where the points are redeemed for a merchandise or a discount on the merchandise, the retailer selecting the merchandise or the discount on merchandise in accord with a marketing agenda established by the retailers; wherein the game functions as a public relations tool used by the entity to build a relationship with a family through education of the younger child.

21. The Internet-based game as defined in claim 17, the game having a near money comprising one or more points awarded in the game,
    wherein the award of the game further comprises an assignment of points and wherein the indicia of account information of the game further comprises information on a tally of the points and the investment portfolio section includes an information on an investment of the points; wherein the game includes a sponsoring site and/or a partner site, and;
    wherein the game includes means for storing and trading points and using the points as near money for a merchandise, a service, or a discount at the sponsoring site and/or at the partner site.

22. A method of providing an Internet-based game for teaching personal values and financial responsibility to a child, the method comprising the steps of:
    (a) providing the Internet-based game for teaching personal values and financial responsibility to a child, the game comprising:
        (i) a set of computer interactive game events, the game events having an adventure story activity and an educational activity, the adventure story activity having a selectable story element;
        (ii) a scoring system in playing the game events, the scoring system including an assignment of an award, the award including a virtual collectible creature, the virtual collectible creature having an artificial intelligence characteristic and having a characteristic mimicking a financial instrument, the financial instrument mimicked including a stock, or a bond, or a savings account, or a credit card, or a money market, or a certificate of deposit, or a mutual fund, or an investment, or interest, or a dividend, or taxation, or a debit card;

(iii) indicia of an account information associated with the child, the indicia of account information relating to the virtual collectible creature including an investment portfolio section and a collectible section for tracking a child's collection of the virtual collectible creature; wherein, the child learns the characteristics of the financial instrument; and the child is taught investment strategy and practices making financial decisions in the context of the game;

(b) providing the child with access to the adventure story activity and providing the child with the selectable story element for the child to select;

(c) providing the child with said interactive game events for the child to interact with and providing the child the assignment of the award for the child to receive, the award including the virtual collectible creature;

(d) providing the child with account information for the child to review.

23. The method of providing an Internet-based game as defined in claim 22, wherein the step of providing the assignment of the award includes providing an assignment of points, and wherein the step of providing the account information includes providing indicia of account information further comprising an information on a tally of the points and wherein the investment portfolio section includes an information on an investment of the points.

24. The method of providing an Internet-based game as defined in claim 22, the step of providing of the game includes providing the game wherein the selectable story element of the game includes an adventure, a companion and an adventure vehicle.

25. An Internet-based gaming system for teaching personal values and financial responsibility to a younger child, the gaming system also being a marketing system between a sponsor and a partner, the gaming system comprising:

a set of computer interactive game events, the game events having an adventure story activity and an educational activity, the adventure story activity having a selectable story element;

a scoring system in playing the game events, the scoring system including an assignment of an award, the award including a virtual collectible creature, the virtual collectible creature having an artificial intelligence characteristic and having a characteristic mimicking a financial instrument, the financial instrument mimicked including a stock, or a bond, or a savings account, or a credit card, or a money market, or a certificate of deposit, or a mutual fund, or an investment, or interest, or a dividend, or taxation, or a debit card;

indicia of an account information associated with the child, the indicia of account information relating to the virtual collectible creature including an investment portfolio section and a collectible section for tracking a child's collection of the virtual collectible creature;

wherein, the child learns the characteristics of the financial instrument; and the child is taught investment strategy and practices making financial decisions in the context of the game;

wherein the game includes a website of the sponsor and a website of the partner, the sponsor being a financial institution, wherein the sponsor provides the game to the younger child through auspices of the sponsor, the partner being a retailer providing discounts on merchandise and/or merchandise for redeeming the award of the game.

26. The Internet-based game as defined in claim 25, wherein the award of the game further comprises:

an assignment of points and wherein the indicia of account information further comprises information on a tally of the points and wherein the investment portfolio section includes an information on an investment of the points.

27. An Internet-based gaming system for teaching personal values and financial responsibility to a younger child, the gaming system also being a teaching tool for use by a teacher at a school for teaching personal values and financial responsibility to the younger child, the gaming system comprising:

a set of computer interactive game events, the game events having an adventure story activity and an educational activity, the adventure story activity having a selectable story element;

a scoring system in playing the game events, the scoring system including an assignment of an award, the award including a virtual collectible creature, the virtual collectible creature having an artificial intelligence characteristic and having a characteristic mimicking a financial instrument the financial instrument mimicked including a stock, or a bond, or a savings account, or a credit card, or a money market, or a certificate of deposit, or a mutual fund, or an investment, or interest, or a dividend, or taxation, or a debit card;

indicia of an account information associated with the child, the indicia of account information relating to the virtual collectible creature including an investment portfolio section and a collectible section for tracking a child's collection of the virtual collectible creature;

wherein, the child learns the characteristics of the financial instrument; and the child is taught investment strategy and practices making financial decisions in the context of the game;

wherein the game further comprises a teacher specific menu option including a lesson plan, a financial lesson, a link to other lesson resources, a tip on how to use the virtual collectible creature in a classroom and a virtual collectible creature dictionary.

28. The Internet-based game as defined in claim 27, wherein the award further comprises an assignment of points and wherein the indicia of account information further comprises information on a tally of the points and wherein the investment portfolio section includes an information on an investment of the points, and wherein the teacher specific menu option-includes an explanation on how to redeem the points for the school.

29. The Internet-based game as defined in claim 27, wherein the teacher awards the younger child with the virtual collectible creature to motivate the younger child.

30. An Internet-based gaming system for teaching personal values and financial responsibility to a younger child, the gaming system also being a public relations tool used by an entity to build a relationship with families through education of the younger child in personal values and financial responsibility, the gaming system comprising:

a set of computer interactive game events, the game events having an adventure story activity and an educational activity, the adventure story activity having a selectable story element;

a scoring system in playing the game events, the scoring system including an assignment of an award, the award including a virtual collectible creature, the virtual collectible creature having an artificial intelligence characteristic and having a characteristic mimicking a financial instrument, the financial instrument mimicked including a stock, or a bond, or a savings account, or a credit card, or a money market, or a certificate of deposit, or a mutual fund, or an investment, or interest, or a dividend, or taxation, or a debit card;

indicia of an account information associated with the child, the indicia of account information relating to the virtual collectible creature including an investment portfolio section and a collectible section for tracking a child's collection of the virtual collectible creature;

wherein, the child learns the characteristics of the financial instrument; and the child is taught investment strategy and practices making financial decisions in the context of the game;

wherein, the game further comprises a listing of the entity as a website of a sponsor or as a website of a partner site, and a listing of special offerings made available by the entity to the younger child who plays the game.

31. The Internet-based game as defined in claim 30, wherein the award further comprises an assignment of points and wherein the indicia of account information further comprises information on a tally of the points and wherein the investment portfolio section includes an information on an investment of the points, and wherein, the entity provides the virtual collectible creature and/or points to the younger child who plays the game.

32. The Internet-based game as defined in claim 31, wherein the partner is a retailer, the retailer providing an on-line site or in store location as said partner site where the points are redeemed for a merchandise or a discount on the merchandise, the retailer selecting the merchandise or the discount on merchandise in accord with a marketing agenda established by the retailer.

33. An Internet-based gaming system for teaching personal values and financial responsibility to a younger child, the gaming system also having a near money component comprising one or more points awarded in the game, the gaming system comprising:

a set of computer interactive game events, the game events having an adventure story activity and an educational activity, the adventure story activity having a selectable story element;

a scoring system in playing the game events, the scoring system including an assignment of an award, the award including a virtual collectible creature, the virtual collectible creature having an artificial intelligence characteristic and having a characteristic mimicking a financial instrument, the financial instrument mimicked including a stock, or a bond, or a savings account, or a credit card, or a money market, or a certificate of deposit, or a mutual fund, or an investment, or interest, or a dividend, or taxation, or a debit card;

indicia of an account information associated with the child, the indicia of account information relating to the virtual collectible creature, including an investment portfolio section and a collectible section for tracking a child's collection of the virtual collectible creature;

wherein, the child learns the characteristics of the financial instrument; and the child is taught investment strategy and practices making financial decisions in the context of the game;

wherein the award further comprises an assignment of the one or more points and wherein the indicia of account information further comprises an information on a tally of the points and an information on an investment of the points; wherein the game includes a sponsoring site and/or a partner site;

and wherein the game includes means for storing and trading points and using the points as near money for a merchandise, a service, or a discount at the sponsoring site and/or at the partner site.

* * * * *